(12) United States Patent
Harel et al.

(10) Patent No.: US 8,971,335 B2
(45) Date of Patent: Mar. 3, 2015

(54) SYSTEM AND METHOD FOR CREATING A TRANSITIVE OPTIMIZED FLOW PATH

(75) Inventors: Amir Harel, Ein-Vered (IL); Alon Lelcuk, Ramot-Meir (IL); Ronit Nossenson, Kfar-Sava (IL); Avinoam Zakai, Sharona (IL)

(73) Assignee: Exafer Ltd, Ein-Vered (IL)

( * ) Notice: Subject to any disclaimer, the term of this patent is extended or adjusted under 35 U.S.C. 154(b) by 545 days.

(21) Appl. No.: 12/827,439

(22) Filed: Jun. 30, 2010

(65) Prior Publication Data

US 2011/0002240 A1 Jan. 6, 2011

Related U.S. Application Data

(60) Provisional application No. 61/222,615, filed on Jul. 2, 2009.

(51) Int. Cl.

| | | |
|---|---|---|
| *H04L 12/28* | (2006.01) | |
| *H04J 3/16* | (2006.01) | |
| *G06F 15/16* | (2006.01) | |
| *G06F 15/173* | (2006.01) | |
| *H04L 12/721* | (2013.01) | |
| *H04L 12/751* | (2013.01) | |
| *H04L 12/46* | (2006.01) | |

(52) U.S. Cl.
CPC ............... *H04L 45/38* (2013.01); *H04L 45/02* (2013.01); *H04L 12/4641* (2013.01)
USPC ........... 370/401; 370/466; 370/467; 709/228; 709/239

(58) Field of Classification Search
CPC ............. H04L 12/66; H04L 29/06163; H04L 29/06068; H04L 45/16; H04L 45/124–45/127
USPC ........... 370/400–418, 466, 467; 709/220–240
See application file for complete search history.

(56) References Cited

U.S. PATENT DOCUMENTS

| | | | |
|---|---|---|---|
| 4,597,078 A | 6/1986 | Kempf | |
| 5,214,646 A * | 5/1993 | Yacoby | ......................... 370/402 |
| 5,249,292 A | 9/1993 | Chiappa | |
| 5,274,631 A | 12/1993 | Bhardwaj | |
| 5,319,644 A | 6/1994 | Liang | |
| 5,477,541 A | 12/1995 | White et al. | |

(Continued)

OTHER PUBLICATIONS

Haito Wu, Yunxin Liu, Qian Zhang, and Zhi-Li Shang, SoftMAC: Layer 2.5 Collaborative MAC for Multimedia Support in Multihop Wireless Networks, IEEE Transactions on Mobile Computing, Jan. 2007, pp. 12, vol. 6, No. 1.

*Primary Examiner* — Un C Cho
*Assistant Examiner* — Jeremy Costin
(74) *Attorney, Agent, or Firm* — Smith Risley Tempel Santos LLC; Gregory Scott Smith

(57) ABSTRACT

Traffic paths based on common devices available in a network are optimized, controlled, manipulated and created. The new paths used to optimize are not limited to the original OSI layer and/or original networks. Thus, various kinds of users/computers/devices, working in the same or in different abstraction layer networks, are combined into one collective virtual network providing the ability to compute and utilize the best (optimal) traffic path for each flow at each given time. The traffic path can be constructed especially for each flow. All or most devices and layer networks are combined in a collective virtual network when computing and constructing an optimized path for a flow. Thus, there is no need to add additional headers to a flow thereby eliminating the addition of overhead to the flow.

30 Claims, 14 Drawing Sheets

(56) References Cited

U.S. PATENT DOCUMENTS

| | | | |
|---|---|---|---|
| 5,600,644 A | 2/1997 | Chang et al. | |
| 5,602,851 A | 2/1997 | Terashita et al. | |
| 5,608,726 A | 3/1997 | Virgile | |
| 5,633,865 A | 5/1997 | Short | |
| 5,633,866 A | 5/1997 | Callon | |
| 5,684,967 A * | 11/1997 | McKenna et al. | 715/853 |
| 5,740,171 A | 4/1998 | Mazzola et al. | |
| 5,790,546 A | 8/1998 | Dobbins et al. | |
| 5,892,924 A | 4/1999 | Lyon et al. | |
| 5,910,954 A | 6/1999 | Bronstein et al. | |
| 6,006,264 A | 12/1999 | Colby et al. | |
| 6,061,334 A | 5/2000 | Berlovitch et al. | |
| 6,088,356 A | 7/2000 | Hendel et al. | |
| 6,147,993 A * | 11/2000 | Kloth et al. | 370/392 |
| 6,243,667 B1 | 6/2001 | Kerr et al. | |
| 6,424,659 B2 | 7/2002 | Viswanadham et al. | |
| 6,628,617 B1 * | 9/2003 | Karol et al. | 370/237 |
| 6,639,901 B1 | 10/2003 | Katzri et al. | |
| 6,674,769 B1 | 1/2004 | Viswanath | |
| 6,717,949 B1 | 4/2004 | Boden et al. | |
| 6,792,471 B2 | 9/2004 | Nomura et al. | |
| 6,853,638 B2 | 2/2005 | Cohen | |
| 6,944,130 B1 | 9/2005 | Chu et al. | |
| 7,197,550 B2 | 3/2007 | Cheline et al. | |
| 7,197,556 B1 | 3/2007 | Short et al. | |
| 7,325,071 B2 | 1/2008 | Krishnan | |
| 2001/0037409 A1 * | 11/2001 | Ricciulli | 709/310 |
| 2003/0167338 A1 * | 9/2003 | Hare et al. | 709/236 |
| 2006/0133405 A1 * | 6/2006 | Fee | 370/437 |
| 2007/0160042 A1 * | 7/2007 | Dollo et al. | 370/389 |
| 2009/0077228 A1 * | 3/2009 | Weil et al. | 709/224 |
| 2009/0116404 A1 * | 5/2009 | Mahop et al. | 370/254 |

* cited by examiner

SYSTEM AND METHOD FOR CREATING A TRANSITIVE OPTIMIZED FLOW PATH

CROSS-REFERENCE TO RELATED APPLICATIONS

This application is a non-provisional application being filed under 35 USC 111 and 37 CFR 1.53(b) and claiming the benefit under 35 USC 120 of the United States Provisional Application for Patent that was filed on Jul. 2, 2009 and assigned Ser. No. 61/222,615, which application is hereby incorporated by reference.

BACKGROUND

The embodiments described within this disclosure relate generally to optimizing traffic paths between networks, and more particularly, to creating a transitive-optimized flow path between Coupled Promiscuity Networks.

A network can be defined as a collection of computers and devices that are connected to each other. Such a network allows users and computers to communicate with each other and share resources and information. However, this classic definition of network is not sufficiently broad to capture the wide intuitive concept, which people today consider as a "network". Many different networks can be defined on connected computers, in any abstraction layer of the Open System Interconnection (OSI) reference model.

For example, in the data link abstraction layer, some computers may be connected directly to each other and belong to the same Local Area Network (LAN), while a pair of devices with indirect connection can construct a network using a Point-to-Point Protocol (PPP) connection between them. As another example, in the application abstraction layer, users of sets of computers and devices might be connected to a particular social network via a particular web page. Another example is an Internet Protocol (IP) address that can represent a server cluster and can describe a specific network in the network abstraction layer.

In networks, data is typically exchanged between communicating nodes in the form of data chunks. Each data chunk comprises a header and a payload. In an Ethernet network, a data chunk is referred as a frame. A frame is a digital data transmission unit having a header and a payload on the data link layer 2. The header can include information about the communicating devices and may include, but is not limited to: the source MAC address (SA) and the destination MAC address (DA) in an Ethernet protocol frame; the information on the specific connection defined between these two communicating devices Data Link Connection Identifier in the Frame Relay (FR) protocol, and so on. The payload can include the data carried by the frame and can carry a wide variety of information. In an Internet Protocol network, a data chunk is referred as a packet. In an ATM network, a data chunk is referred as a cell. Thus, within the context of this description, the terms: data chunk, frame, packet and cell can be used interchangeably to refer to similar, underlying data formats that include a header and a payload. Henceforth, in context of this description, drawings and claims, the term frame may be used as a representative term for data chunk.

A flow is a sequence of frames associated with a single logical connection between communicating devices. A flow can be defined by a one-to-one relationship between two communicating devices (uni-cast) or by a one-to-many relationship between two or more communicating devices (multi-cast and broadcast). A flow can be identified for each data frame based on the various headers-fields-combinations. The headers-fields-combination can be formed by selecting all fields, or a specific field within the headers of the multiple layers protocols. For example, a flow can be identified using a source MAC address field and a destination MAC address field in the header of a layer 2 Ethernet protocol together with a source port field and a destination port field of a layer 4 TCP header. Another example of a flow can be associated with a specific TCP connection. In this case, the flow frames can be identified using the quartet fields: a source IP address, a destination IP address, a source port and a destination port, for example.

A session is a series of communications in an application layer, initiated by a user or a device. A point-to-point protocol (PPP) session can be initiated when a user logs into a network with a user-id and a password, for example. Another example can be a Dynamic Host Configuration Protocol (DHCP) session, which can be initiated when a user device obtains an IP address from a network. A user may initiate multiple sessions on the same device. For example, a user may be using a computer that is downloading a Video on Demand movie in a first session and the user may also be browsing the World Wide Web (WWW) in a second session. Note that a session can be comprised of one or more flows depending on the application. An HTTP browsing session to a particular web page can be comprised of multiple TCP connections downloading the page objects, for example.

The task of identifying a complete set of flows associated with a specific session is complicated as can be understood from the above described example of an HTTP browsing session. A web page can consist of multiple objects in multiple domains. A browser application might open several Transmission Control Protocol (TCP) connections to download the objects associated with a requested web page. Because each domain might have a different IP address, it is impossible to associate these TCP flows with the same hypertext transfer protocol (HTTP) session without analyzing the origin of the HTML objects and/or performing a Deep Packet Inspection (DPI) operation on the HTTP referrer headers. Henceforth throughout this disclosure the term "session" will be used with respect to a set of flows that have a simple logical connection in an application layer. For example, this may consist of two flows that produce a bi-directional TCP connection. Note that this flow set might not include all flows associated with a particular session.

Various devices exist for transmitting frames within a network or between networks. These devices may operate at one or more OSI model layers, including the physical, data link, network, or transport layers, for example. A switch, a bridge and a gateway are examples of hardware devices providing physical connections within or between different networks and that operate at the data link layer. Routers usually route frames using higher protocol information, to determine the ultimate destination of the frame and to determine an optimum path from the source network to the destination network, for example.

Classic routing algorithms, such as those used by a Border Gateway Protocol (BGP), for example, are designed to optimize the routing path between source and destination addresses, in the Internet, for example. FIG. 1A illustrates the prior art public network topology 100 that is assumed to be in place for such routing algorithms. As can be seen from this FIG. 1A, the public network 100 can be comprised of multiple networks separated by long distances, measured in the number of hops, between a plurality of users 101,103,105 and server 110. An exemplary long routing path between user "A" 101 and the server 110, can be through a plurality of routers: 120, 121, 123, 125, 127 and 129 and switch 130.

Today, with the existence of large Content Networks 150 (FIG. 1B, a prior art network), the above described topology 100 has changed. The content networks are huge and highly connected to other networks, resulting in a flatter topology 140 as illustrated in FIG. 1B, for example. In the typical prior art flat topology 140, the distance between a plurality of users 102,104,106 and their requested content on servers 122,124 is shortened.

In the prior art, a Session Border Controller (SBC) is a device used in some Voice over IP (VoIP) networks to exert control over the signaling and the media flows involved in setting up, conducting, and tearing down calls. The fact that most of the signaling and media packets pass through the SBC allows the SBC to provide a number of services, including, but not limited to: measurement, access control, routing of media packets and signaling packets based on present rules and policies, protocol conversion and codec trans-coding, firewall and network address translator (NAT) traversal, quality of service (QoS) enforcement, and topology hiding. These functions can be implemented by one or more application servers running on the SBC.

In common communication networks it is possible to change a path of a flow to a different network and/or to a different OSI layer. In such communication networks, the flow is encapsulated and additional headers are added to it thereby increasing the overhead of the data packets of the flow. A few non-limiting examples of communication networks that use this technique/protocol include: MPLS, GMPLS, etc. When a GMPLS and/or MPLS network decides to change a path of a flow, among other actions, GMPLS and/or MPLS encapsulates the flow by adding a header with forwarding information (referred to as a label). This operation results in increasing the overhead of the data packets of the flow.

Communication networks that add additional headers are fast but not sophisticated networks. Flows can accumulate many headers across the path that it needs to be transferred through. For example, a common situation can be one in which a flow is transferred over Voice IP, over the Internet, over switching, over IP over the Internet, and so on. Adding more headers (encapsulation of the data traffic) increases the bandwidth consumption of the flow.

Furthermore existing communication networks that calculate an optimized path and modify the flow accordingly can require edge devices at the edges of the flow path. The edge devices are needed for encapsulating and\or de-encapsulation and adding additional headers with forwarding information in order to divert the flow to a new path according to the optimization plane. In GMPLS and MPLS, the edge devices can be routers, referred as label edge routers (LER), for example. Common communication networks may also require a link management system and or method because they create a new network on top of existing networks, creating more complexity and so on. Therefore there is a need for an elegant, sophisticated, and uncomplicated method and system that will enable creating an optimized path for a flow with minimal or no overhead.

BRIEF SUMMARY

Exemplary embodiments of the present disclosure provide examples of novel systems and methods that optimize, control, manipulate and create traffic paths using means and common devices readily available for installation or already existing and/or operating on these networks, without being limited to the original OSI layer and/or original networks. Exemplary embodiments of such flow optimizers unite various kinds of users/computers/devices, working in the same or in different abstraction layer networks, into one collective virtual network. Advantageously, this provides the ability to compute and utilize the best (optimal) traffic path for each flow at each given time. The traffic path can be constructed especially for each flow. The novel system and method can utilize and control all devices and layer networks in its collective virtual network when computing and constructing an optimized path for a flow. Thus, there is no need to add additional headers to a flow thereby eliminating the addition of overhead to the flow. Furthermore, embodiments of the flow optimizer seek to peel off as many headers as possible from the flow, thus actually reducing the bandwidth consumption of the flow. Furthermore, as will be described below, embodiments of the flow optimizer do not create a new network, but rather, the various embodiments use the existing networks with their existing protocols, and therefore exemplary embodiments do not require a link management protocol, for example. Exemplary embodiments of the flow optimizer may use different criteria to compute an optimal path. A traffic path can be, but is not limited to: the traffic path with the shortest latency, the less loaded path, etc.

In the various network layers of the OSI model, different network types may exist. For example, in the data link layer network, computers can belong to a specific Local Area Network. In the application layer network, users (of computers, devices and etc.) can be connected to a particular Social network via a particular web page. Embodiments of the flow optimizer enable different connected sets of users/computers/devices in different abstraction layer to be considered and/or referred to as a collective virtual network (CVN). Advantageously, this enables the computation of an alternative and optimized path for a flow regardless of the OSI layer and/or other network boundaries.

Throughout the description, two or more networks, such as N1 and N2, are referred to as "Coupled Promiscuity Networks" (CPN) if a set of devices D collectively receives and transmits, or passes through, all the frames of networks N1 and N2 (N1 and N2 networks might belong to different abstraction layers). By controlling the device set D, one can modify and manipulate the traffic on both networks N1 and N2. The device set D, consisting of one or more devices that collectively exhibit promiscuous transmitting of data with rewrite capabilities is referred to as the "Transmitting Device Set with Promiscuous and Re-writing Capabilities" (TD-SPRC). If a device from the set D does not have promiscuous capabilities, for example a layer-2 switch, then a commercial promiscuous device can be associated with the device to create a TDSPRC set. An exemplary commercial promiscuous device can be a DPI device such as, but not limited to, Cisco's SCE or Allot's NetEnforcer.

An embodiment of the flow optimizer operates to optimize the delivery of information between a first node on a first network and a second node on the same or different network. In general, the delivery is accomplished through a networked system in which one or more paths between the first node and second node are known, such as by a common addressing and a known connectivity mechanism, and a promiscuous device that receives and retransmits all frames of the first network and the different network. In operation, alternate paths between the first node and the second node are identified. In one embodiment this is accomplished by receiving a message, identifying a new network associated with the message, and including the new network in the collective virtual network. In other embodiments, various triggering events may occur to invoke this process. Next, a collective virtual network is created which includes the known paths and the alternate paths. For a particular flow, the data is delivered by identifying an optimal path in the collective virtual network and then modifying the data flows to be compatible with the network technology employed by the identified optimal path.

FIG. 2 is a simplified portion of a network diagram illustrating an exemplary communications network N 200 in which an exemplary embodiment of the flow optimizer can be used. It should be appreciated that the various embodiments described may include a variety of structures, capabilities and functionality and that not all embodiments must incorporate all such structure, capabilities and functionality. However, the term flow optimizer, although it may not accurately describe all embodiments, is used to refer to a generic embodiment. Network N 200 is shown as including a Local Area Network (LAN) L1 201 with a single switch S1 220 and a LAN L2 202 with a single switch S2 222. Users A 210 and B 211 belong to or are associated with LAN L1 201 and users C 215, D 213 and E 212 belong to or are associated with LAN L2 202. Routers R1 233 and R2 231 connect the local area networks L1 201 and L2 202.

FIG. 3 schematically demonstrates different optional embodiments of Coupled Promiscuity Networks (CPN) utilizing a flow optimizer over network N of FIG. 2 by presenting three simplified examples of optional network topologies. The network topology graph associated with N 200 is described in graph "A" 310, assuming that N does not include any other networks. The network vertex set Vn consists of the two LANs L1 201 and L2 202. The transmitting device sets with promiscuous and re-writing capabilities (TDSPRC) is denoted by Vd and consists of two switches S1 220 and S2 222. A set of a plurality of connections is shown between Vn and Vd and comprises two connections L1 to S1 (314) and L2 to S2 (312). Because the routers R1 233 (FIG. 2) and R2 231 (FIG. 2) do not transmit all traffic of LAN L1, or LAN L2, their node is not represented in graph "A" 310 (meaning they are not a TDSPRC to networks 201 and 202). According to the present disclosure by definition: LANs L1 201 and L2 202 are considered Coupled Promiscuity Networks (CPN) under the set of switches S1 220 and S2 222 (switches S1 and S2 both have promiscuous capabilities).

Graph "B" 320 is another exemplary network. Exemplary network 320 includes two more networks in addition to the networks described in the first example, N 200 (FIG. 2). The additional two networks are: a Virtual LAN V1 322 and a Virtual LAN V2 324. V1 322 and V2 324 are defined within L2 202, with user C 215 in V1, and users D 213 and E 212 in V2. The corresponding networks topology graph associated with N 200 and the added V1 and V2 is described in graph "B" 320. The network set Vn consists of L1 201, L2 202, V1 322 and V2 324. The set of TDSPRC, Vd, consists of switches S1 220 and S2 222. A plurality set of connections exist as illustrated in the drawing: L1 to S1 (314), L2 to S2 (312), V1 to S2 (326), and V2 to S2 (328). In this graph, any pair of the networks V1, V2 and L2 is a Coupled Promiscuity Network (CPN) under the TDSPRC S2.

Graph "C" 330 is another exemplary network. Exemplary network 330 includes two more networks in addition to the networks described in the first example, N 200 (FIG. 2): two Peer-to-Peer (P2P) networks P1 332 and P2 334. User 'A' 210 and 'C' 215 belong to P1 and user 'B' 211 and 'D' 213 belong to P2. The corresponding networks topology graph associated with N 200 including P1 and P2 is described in graph "C" 330. Note that in this case, the device set R1 233 (FIG. 2) U R2 231 (FIG. 2) transmits all traffic of both P1 332 and P2 334 and as a result, P1 and P2 are Coupled Promiscuity Networks (CPN) under the TDSPRC R1 U R2 336 (in addition to other device sets). The mathematic symbol R1UR2 represents the union of R1 and R2.

Coupled promiscuity is a transitive relationship. Thus, if N1 and N2 are CPNs under a set of TDSPRC devices D, and N2 and N3 are CPNs under this set of TDSPRC devices D, for example, then N1 and N3 are also CPNs under the set of TDSPRC devices D as well. As another example: if N1 and N2 are CPNs under a set of TDSPRC devices D1, and N2 and N3 are CPNs under a set of TDSPRC devices D2, then all networks N1, N2, N3 are CPNs under the set D=D1 U D2.

The present disclosure describes a novel collective virtual network topology. The novel collective virtual network topology utilizes a smaller set of TDSPRC to connect larger numbers of networks, thus creating a collective virtual network (CVN) of CPNs. This means that in the new CVN topology, controlling a small device set can provide the power to modify and manipulate traffic flows of many CPNs. The change of a path and/or creation of a new path for a flow in the CVN can be done at the existing TDSPRC along the optimized path, for example. The flow optimizer can re-write the existing flow headers and\or remove one or more of the existing flow headers at the TDSPRC, thus changing the flow path from one network of the CPN to another network of the CPN. In one exemplary embodiment, the novel system and method can manipulate the existing TDSPRC that transfers the network traffic flow, therefore creating new possibilities for flow path and flow path optimization. Therefore, in the flow optimizer there is no requirement for edge devices at the edges of the optimized path, unlike prior art systems. Furthermore exemplary embodiments of the flow optimizer do not add headers to the flow, unlike prior art systems and method. Unlike prior art methods in which the forwarding information is separated from the original data traffic headers, exemplary embodiments of the flow optimizer do not add forward information headers. An original header is one of the headers associated with the frame at the host that creates the frame—the source host. Headers such as, but not limited to, layer 3 headers (IP header), layer 2 header (Ethernet header), etc. Instead embodiments of the flow optimizer re-write or replace one or more existing original headers and\or removes one or more headers at the existing TDSPRC.

The novel approach of reducing and/or re-writing headers of a flow in order to change the flow path, instead of the common approach of adding headers, reduces the bandwidth of the flow. Decreasing the amount of headers creates many benefits, such as but not limited to: lower costs, smaller BW consumption thus faster communication, improved surfing experience, decrease of potential errors, and so.

The present disclosure does not require the addition of a link management system, because the present disclosure exploits a plurality of existing networks, their protocols and their existing link management system. Unlike prior art systems and methods, which create a new network, thus requiring link management protocols, additional headers, etc., the various embodiments of the flow optimizer is more efficient and cost effective.

In typical systems that are common in the arts, frames that are transmitted to/from a user device are encapsulated with additional layer (header), which defines a certain path. For example, the labeling of GMPLS and MPLS is added to a frame for indicating a certain path. In the various embodiments presented in the disclosure and their equivalents, the modification of the flow can be done in one or more headers in layers 2 to 7 of the frame that is sent from a user device, for example. For example one technique includes re-writing the MAC address destination in the data link layer.

The disclosure presents novel systems and methods for allowing traffic path optimization over CPN under the new collective virtual network topology, using different cost functions. Cost functions such as, but not limited to: short routing paths, low latency, etc. Low costs of broadcast and multi-cast session transmission on multi-networks can be achieved easily, for example.

The novel optimization system and method addresses the traffic path optimization between CPN in the CVN topology. Using application control information, the novel system and method can manipulate the TDSPRC to enable virtualization of sessions in CPN to provide traffic optimization. The session virtualization concept is described in detailed in conjunction with the description of FIG. 8. The per-session virtualization on the CPN provides a flexible optimization method.

The novel and unobvious approach of the present disclosure includes exploiting an existing TDSPRC to generate an un-trivial and un-obvious connection between networks that do not have predefined communication connections between each other.

The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific exemplary embodiments are described in detail to illustrate the inventive concepts to a person skilled in the art, such embodiments can be modified to various modifications and alternative forms. Accordingly, the figures and written description are not intended to limit the scope of the inventive concepts in any manner.

BRIEF DESCRIPTION OF THE SEVERAL VIEWS OF THE DRAWING

Exemplary embodiments of the present invention will be understood and appreciated more fully from the following detailed description, taken in conjunction with the drawings in which.

DETAILED DESCRIPTION OF EMBODIMENTS OF THE INVENTION

Turning now to the figures in which like numerals represent like elements throughout the several views, exemplary embodiments of the flow optimizer are described. For convenience, only some elements of the same group may be labeled with numerals. The purpose of the drawings is to describe exemplary embodiments and is not for production purpose. Therefore features shown in the figures were chosen only for convenience and clarity of presentation.

FIGS. 1A, 1B, 2 and 3 have been described above and are not addressed any further.

Figure 4:
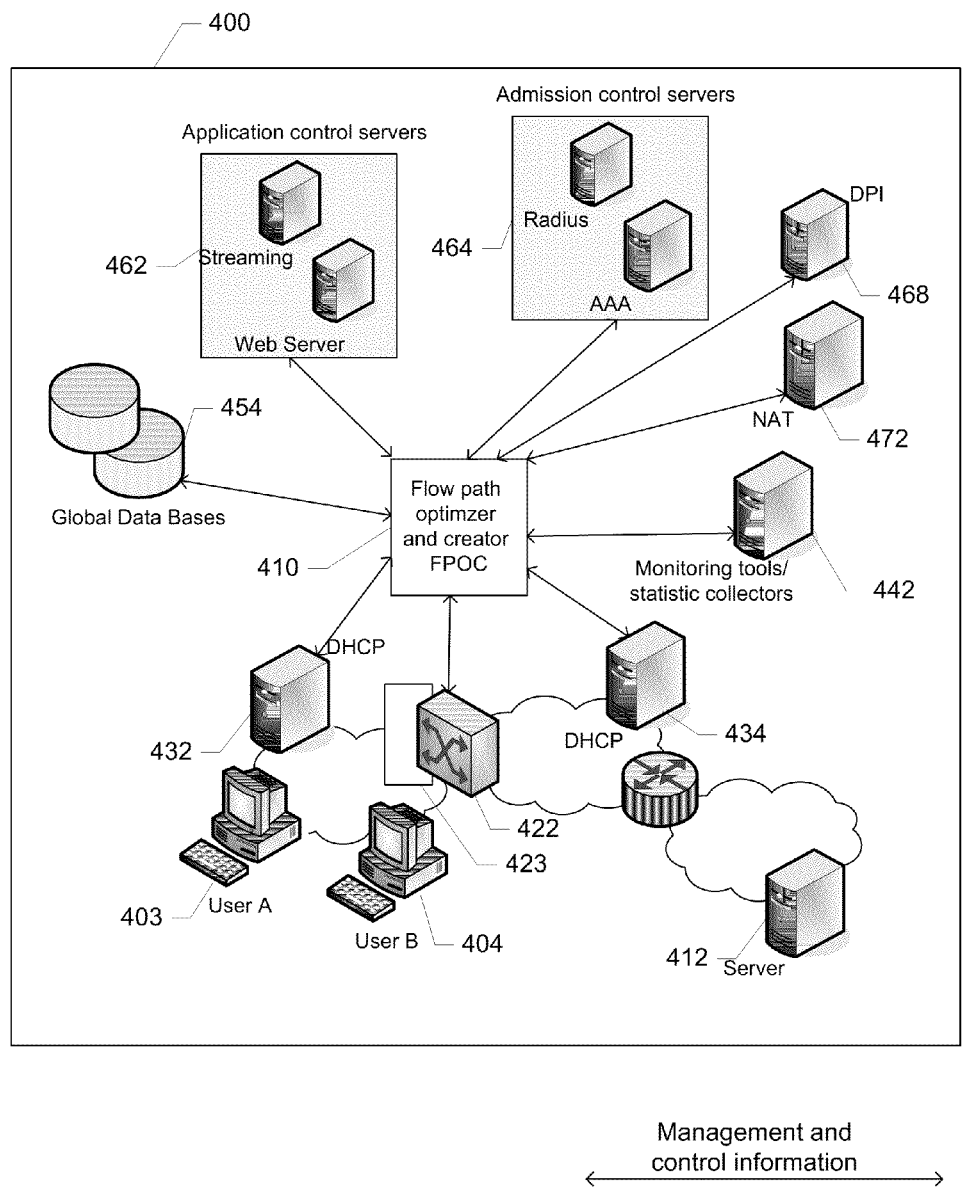
FIG. 4 is a simplified block diagram illustration of an exemplary embodiment of a collective virtual communication network in which a novel flow path optimizer and creator interfaces to different networks and devices, according to an exemplary embodiment of the present disclosure.

FIG. 4 is a simplified block diagram illustrating an exemplary embodiment of a collective virtual communication network (CVN) 400 in which an exemplary embodiment of a flow path optimizer and creator (FPOC) 410 can be implemented or deployed. The flow path optimizer and creator (FPOC) 410, as illustrated, can interface with different networks and devices. The flow path optimizer and creator (FPOC) 410 can interact with several possible network entities as shown in FIG. 4. For instance, the FPOC 410 can interface with the following elements: a TDSPRC such as switch 422 that can handle the traffic of a plurality of users (user A 403 and user B 404 and servers traffic 412, for example) or other devices with promiscuous/re-write capabilities 423. In addition, exemplary CVNs 400 can potentially include: switches, Quality-of-Service policies enforcers, router sets and etc (not shown in the drawing). The ability of the FPOC 410 to control and configure devices, such as switch 422, allows the FPOC 410 to manipulate the traffic. The FPOC 410 can control and configure devices by sending control commands or information in-band and/or out-of-band.

The FPOC 410 can also interface with addressing servers 432 and 434 from some of the CPN, a Dynamic Host Configuration Protocol (DHCP) server or an LDAP server, for example. These servers can provide information that can be useful for managing some of the CPN that can be used in present disclosed processes such as, but not limited to, an optimization process. The FPOC 410 can also interface with one or more monitoring tools and statistic collectors 442. These interfaces can be used to collect information that can be useful in the present disclosure optimization methods. In addition, the FPOC 410 can supply these tools with internal information as well. The FPOC 410 can also Interface with one or more Global data bases 454 such as, but not limited to, a DNS (Domain Name Service) or Structured Query Language (SQL) servers. The FPOC 410 can use such databases to receive information on content servers or in the other direction to publish its own application servers, for example.

The FPOC 410 can also interface with one or more application control servers 462. Exemplary application control servers can be streaming servers and\or Web servers. These servers can help the FPOC 410 with the present disclosure methods of optimizing a session traffic path, for example. The FPOC 410 can also interface with one or more admission control servers 464. Admission control servers include, but are not limited to, Radius and other AAA (authentication, authorization and accounting). These servers can provide the FPOC 410 admission information on networks, users, servers and etc.

The FPOC 410 can also interface with one or more DPI (Deep Packet Inspection) helper servers 468. Information from a DPI helper server 468 can be used for, but is not limited to, identifying additional sessions which are candidates for optimization. In some networks, in which a network device such as switch 422 does not have promiscuous or re-writing capabilities, then one or more DPI devices 468 or NAT (Network Address Translation) devices 472 can be associated with this network device in order to construct a TDSPRC. If switch 422 is a Layer 2.5 switch, a DPI device may not be needed, for example.

The FPOC 410 can also interface with one or more NAT devices 472. Information from these NAT devices 472 can be used in the present disclosure session virtualization process\method in a CPN, by rewriting the flows frames addresses, for example. In addition, server NAT device can provide information on some of the CPNs that can be used in optimization methods.

More information about the integration and the interfaces of exemplary embodiments of the present disclosure is disclosed below in conjunction with two optimization examples in FIG. 9 and FIG. 12.

Note that some of the above detailed entities can be implemented within the FPOC 410 as well. In addition, the FPOC 410 can interact with any other network entity that can provide information on the networks, the users, or the servers, etc. For example, the FPOC 410 could interact with a Home Location Register (HLR). Yet in an alternate embodiment, the FPOC 410 can be embedded within one of those entities.

Figure 5:
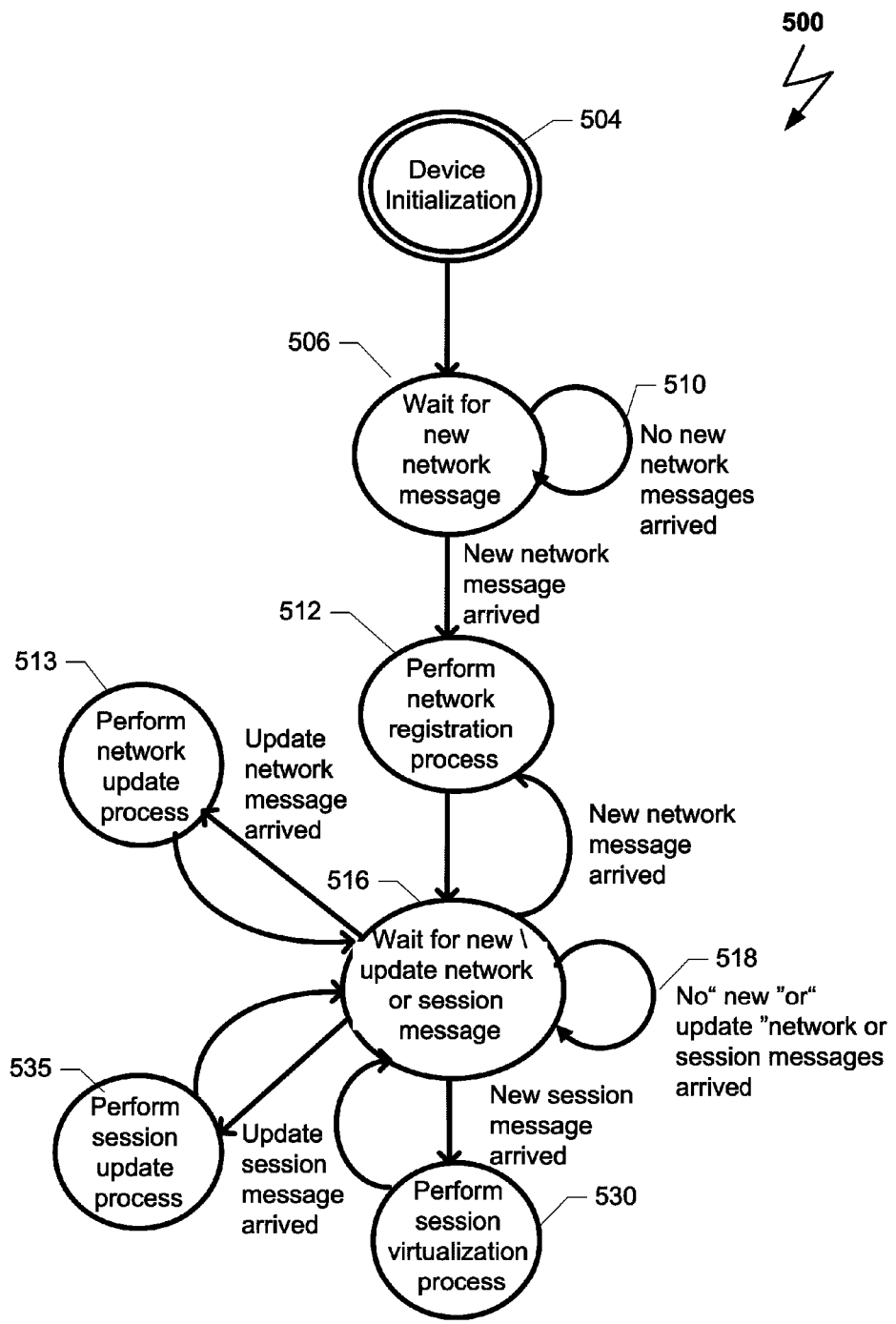
FIG. 5 schematically illustrates an exemplary a finite state machine of a flow path optimizer and creator, according to an exemplary embodiment of the present disclosure.

FIG. 5 is an exemplary flow diagram illustrating relevant steps of an exemplary finite state machine (FSM) 500 used by an embodiment of an FPOC 410 (FIG. 4). Initialization 504 of the FSM 500 can be during the power up process of the FPOC 410, for example. At the initialization state, the FSM 500 can initially configure the TDSPRC to copy or pass relevant frames to the FPOC 410 ports. Exemplary relevant frames can be, but are not limited to, frames related to discovery of new networks, such as initialization of a point-to-point (PPP) session (PPP link establishment phase messages); frames related to a new DHCP session, and so on. After initialization, the FSM 500 can proceed to state 506.

At state 506, the FSM 500 waits for messages on a new network discovery. The FSM 500 can stay or loop back 510 into this wait state 506 until such message arrives. Once a new message arrives, the FSM 500 can perform a network registration process 512. The network registration process 512 is described in detail in conjunction with the description of FIG. 7.

The FSM 500 can maintain a dynamic database of the discovered CPN. Whenever a new network is discovered, the relevant information is collected using the FPOC control schema at the network registration process (detailed in conjunction with FIG. 7). At the end of the network registration process 512, the FSM 500 uses the network information to configure new rules for the relevant TDSPRC, which deals with future new sessions on this network or updates events on this network. These rules may define event triggers to be notified or forwarding rules for this network traffic. Exemplary event triggers can be, but are not limited to, TCP connection establishment (SYN message); RTSP session establishment (SETUP message); and so on.

After the registration 512 of the first discovered network, the FSM 500 waits 516 for an arrival of a new network message. An exemplary new network message may be: a message regarding a new CPN discovery; message regarding a discovery of a new session from a registered network; message regarding an update of a CPN; a message regarding a session from a registered network; etc. If a new CPN is discovered, then the FSM 500 can return to state 512 and perform the network registration process. If a new message regarding a new session on a registered network arrives, the FSM 500 can proceed to the state 530. At state 530 the FSM 500 can perform a session virtualization process 530. Session virtualization process 530 is described in detailed in conjunction with the description of FIG. 8.

Generally, in the session virtualization process 530, the FPOC 410 can create a session optimization plan using a control schema and verify this plan. Then, the FPOC 410 can configure additional new rules for the relevant TDSPRC, which deals with new flows of this session on this network. If an update message of a CPN arrives, then the FSM 500 can proceed to state 513 where it performs the required update operations 513. Exemplary required update operations can be: updating the network information in the system, statistics, and etc. If an arrival of update messages regarding an active session from a registered network arrives, then the FSM 500 proceeds to state 535 where the FSM 500 can perform update operations. As an example, the FSM 500 may start to deal with a new flow of an active session. If no new or update network or session arrives, FSM 500 loops 518 at sate 516.

Exemplary operations of such an FSM implementation are provided in two optimization examples such as the two presented in conjunction with the description of FIG. 10 and FIG. 13 below.

Figure 6:
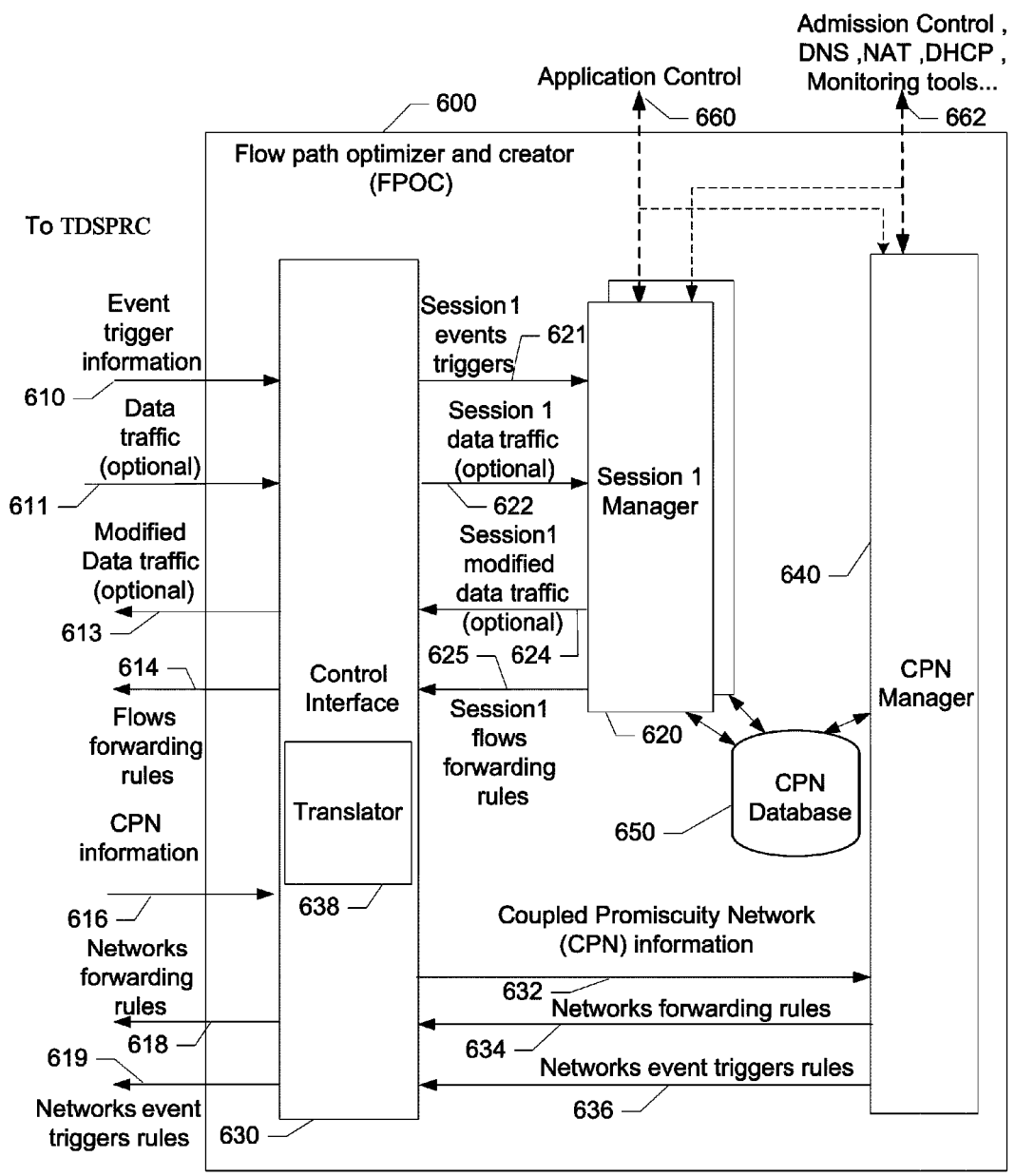
FIG. 6 is a simplified block diagram with relevant elements of an exemplary flow path optimizer and creator.

FIG. 6 is a simplified block diagram with relevant elements of a flow path optimizer and creator (FPOC) 600, according to an exemplary embodiment. The FPOC 600 can comprise three main components: a control interface 630, a session manager 620, and a CPN manager 640. The control interface 630 can be responsible for directing the received event triggers 610 to the proper session managers 620 together with (optionally) data traffic 611. For example, the FPOC 600 might deal with the data traffic when the data traffic is encapsulated, and the TDSPRCs do not support manipulating of encapsulated data. Note that the FPOC can transfer such encapsulated traffic to another device capable of handling it in wire speed, such as a DPI (deep packet inspection) device or an application specific server or agent, for example.

In case of encapsulated traffic between two network entities A and B, an exemplary FPOC 600 can act as a proxy device, replacing the session between A and B with two sessions by manipulating the existing frame headers of the flow. Thus, the FPOC 600 can create a session between A and the FPOC 600 and one between the FPOC 600 and B. Alternatively, the FPOC 600 can act as a transparent proxy by replacing the session between A and B with the two sessions one between A and the FPOC 600 and one between the FPOC 600 and B together with the additional condition that one side (for example, A) is not aware of the fact that the proxy exists, and the proxy mimics the behavior of the other side (B). Yet in another embodiment, the FPOC 600 can act as a transparent entity to both sides A and B and manipulate the frames without the awareness of any side. Manipulating frame headers can involve actions such as re-writing the headers, removing headers, etc. Thus, such operations in have the effect of changing the network on which the flow will be carried. More details regarding this aspect are disclosed in conjunction with the description of FIGS. 10 and 13. In addition, the control interface 630 can send CPN information 632 to the CPN manager block 640. The control interface 630 can use a translator 638 for translating the forwarding rules of flows and networks 618 according to the TDSPRC syntax, for example.

The external inputs of the control interface 630 can include: (i) All sessions event trigger information 610; (ii) All sessions required data traffic, for example encapsulated PPPoE (Point-to-Point Protocol over Ethernet) or GPRS Tunneling Protocol (GTP), that the TDSPRC cannot handle 611; (iii) CPN information 616; and so on.

The internal input of the control interface 630 can comprise: (i) Modified data traffic 624 that the TDSPRC cannot handle per session; (ii) Flows forwarding rules 625 per session (might need translation according to TDSPRC); (iii) Networks forwarding rules 634; networks event triggers rules 636 (that might need translation according to the TDSPRC); and so on.

The external output of the control interface 630 can comprise: (i) Modified data traffic 613 that the TDSPRC cannot handle; (ii) Flows forwarding rules 614 to all relevant flows; (iii) Networks forwarding and re-writing rules 618 to all relevant networks; and (iv) Networks event triggers rules 619; and so on.

The internal outputs of the control interface module 630 can comprise: (i) Event trigger information per session 621, that is, the control interface divides the triggers to sessions and submit the information to the corresponding session manager; (ii) Data traffic (for example PPPoE, GTP) that the transmitting devices cannot handle per session 622 (Again, the control interface associates the data traffic with its session manager and directs the traffic accordingly); and (iii) CPN information 632 is passed directly to the CPN manager block 640; etc.

The CPN manager 640 can be responsible for building and dynamically maintaining the estimated networks topology graph for the FPOC 600. For each new CPN discovered, the CPN manager 640 can update the estimated networks topology graph with the new network and estimates the device sets that transmit its entire traffic to construct the proper connections. The network topology graph can be represented and implemented using any common graph representation such as, but not limited to, vertex matrix.

The CPN manager 640 can initially configure the TDSPRC to receive all messages regarding a new network discovery. Examples of such messages can be: a new Peer-to-Peer network establishment, a first browsing session to a new content site, etc. For each new CPN discovered, the CPN manager 640 can perform a network registration process (described in details in conjunction with the description of FIG. 7). At the end of this process, the CPN manager 640 can add the network record to a CPN database 650 with the network information. Portions of CPN database 650 can be published to external databases such as but not limited to DNS databases. The information on the CPN can be received from a control interface 632 in addition to information from one or more external entities 662. External entities 662 can include elements such as, but not limited to: DHCP servers, admission control servers, global databases (DNS, for example), NAT and monitoring and statistic tools. Using the information on the network, the CPN manager 640 can determine the networks event triggers 636 and networks forwarding rules 634.

The session managers 620 can determine the session forwarding rules to perform the session traffic optimization. The session managers 620 can receive session event triggers 621 from the control interface 630. Exemplary event triggers for the session can be: an arrival of a new flow of the session, a change in QoS (quality of service) parameter on the session traffic, etc. In case the session traffic is encapsulated and the TDSPRC cannot handle encapsulated traffic, the session manager 620 can modify the data and transfer the modified session data traffic 613 toward the transmitting device via the control interface 630, for example. The modification of the data traffic is described in more detail in sections below.

The session manager 620 can receive additional control information from application control servers 660. The additional control information can arrive in a pre-defined, and/or in-band and/or out-of-band manner. Other sources of information regarding the session optimization plan can be in the CPN database 650 and/or the admission servers and NAT servers. Once the information for the session optimization plan is ready, the session manager 620 can create a session virtualization process, and decides exactly what to do with the session flows. When the optimization plan is completed, the session manager 620 can verify the computed and receive conditions of the plan, and in view of this, the session manager 620 can generate the session's flows forwarding rules.

Figure 7:
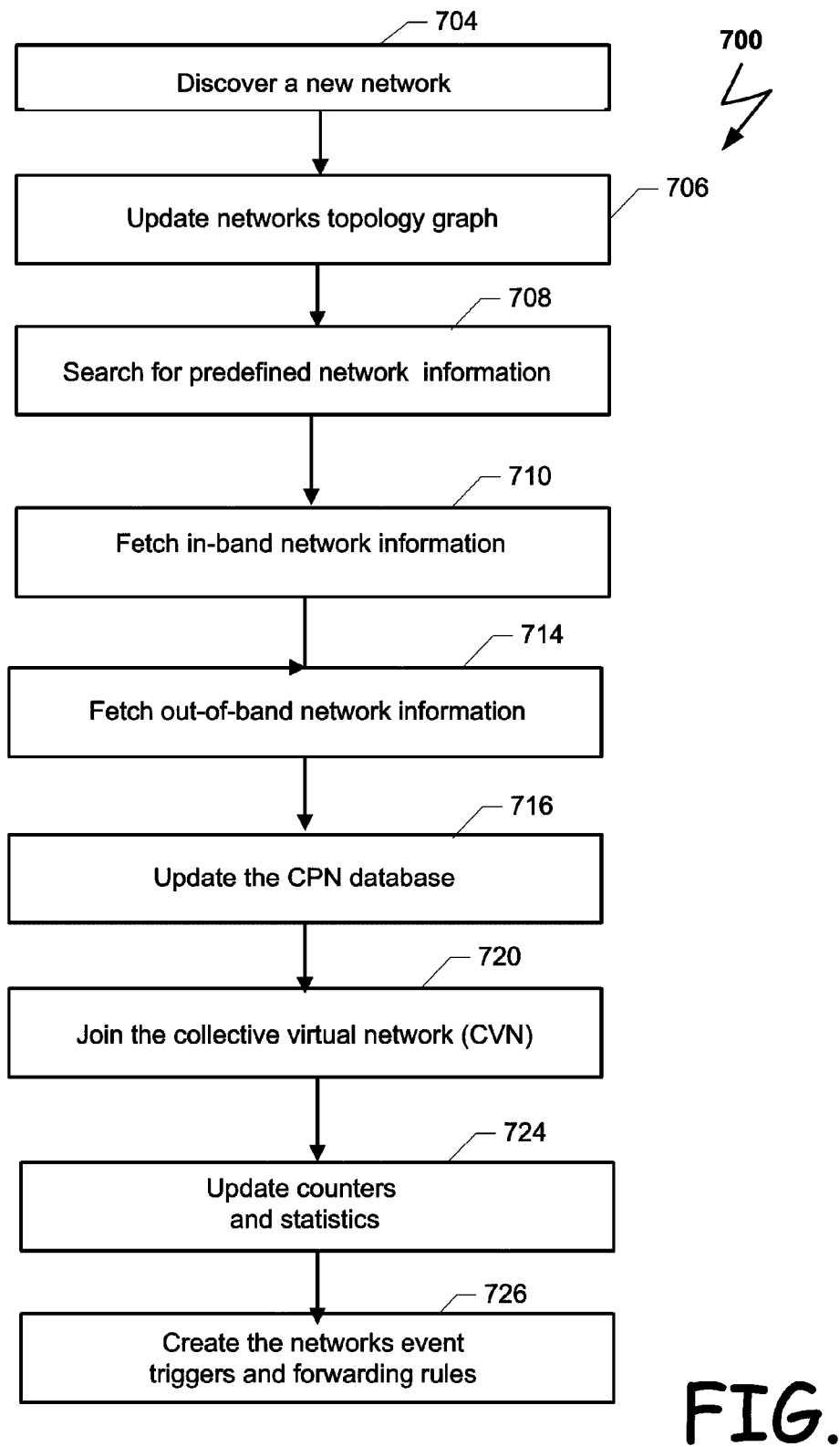
FIG. 7 illustrates a flowchart with relevant steps of a network registration process, according to the teaching of the present disclosure.

FIG. 7 illustrates a flowchart with relevant steps of an exemplary network registration process 700, according to various aspects presented in the present disclosure. Method 700 can be executed by the CPN manager 640 (FIG. 6) when a new network is discovered, for example. Method 700 can be initialized when a new network is discovered 704 according to many possible protocols such as PPPoE, DHCP, PPP, Mobile IP, L2TP, GTP and others), and networks provisioning or pre-defined information.

At 706, method 700 can update the estimated networks topology graph with the new network and with the estimated connections to the TDSPRC that transmits the entire traffic for the network. Optionally, the new derived topology can be updated to the CPN DB 650 (FIG. 6).

Next, the method 700 can start 708 a control schema. To provide a flexible optimization plan for each CPN, the control schema supports in-band and out-of-band control channels in addition to the trivial pre-defined control information. At step 708, the pre-defined control information on the network is fetched (if it exists) from the network record in the CPN database 650 (FIG. 6). Next, at step 710, additional in-band control information (if it exists) is fetched from the received information on the network. At step 714 the CPN manager 640 (FIG. 6) fetches out-of-band control information on the network. Thus, it opens a communication channel to some entities from the network (such as application server, VLAN switch, admission servers, etc.) and receives information regarding the network traffic optimization. At step 716 the CPN manager 640 (FIG. 6) can update the network record in the CPN database 650 (FIG. 6) with the control information.

At step 720, according to the network context, the discovered network can be combined as a member of the collective virtual network to be used in future operation. For example, it can join a specific VLAN or ask for a temporary IP to be used for the virtualization, in this way the FPOC can either join or create a new broadcast domain and optimize traffic load, for example. An additional example can be joining a multi-cast group which can be useful in reducing streaming traffic load.

Next, method 700 proceeds to step 724 where it updates counters and statistics collectors that might be internal and/or external. Finally, method 700 creates 726 network event triggers and forwarding rules. The CPN manager 640 (FIG. 6) can execute step 726 by using the network information to provide the relevant event triggers for this network and/or some forwarding rules for this network traffic to be used by the relevant TDSPRC.

Figure 1A:
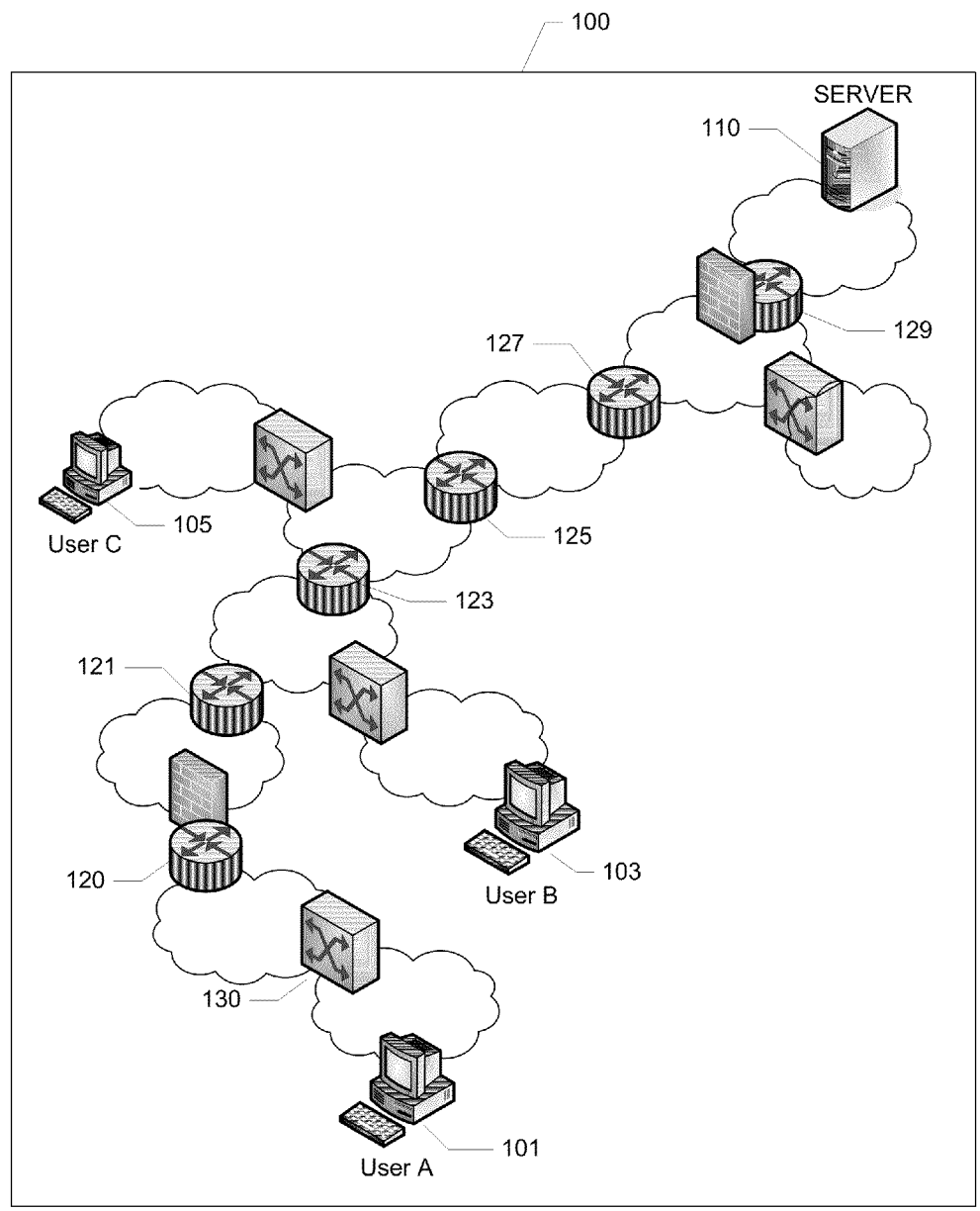
FIG. 1a is a simplified block diagram illustration of an exemplary prior art topology of a communication network.
Figure 1B:
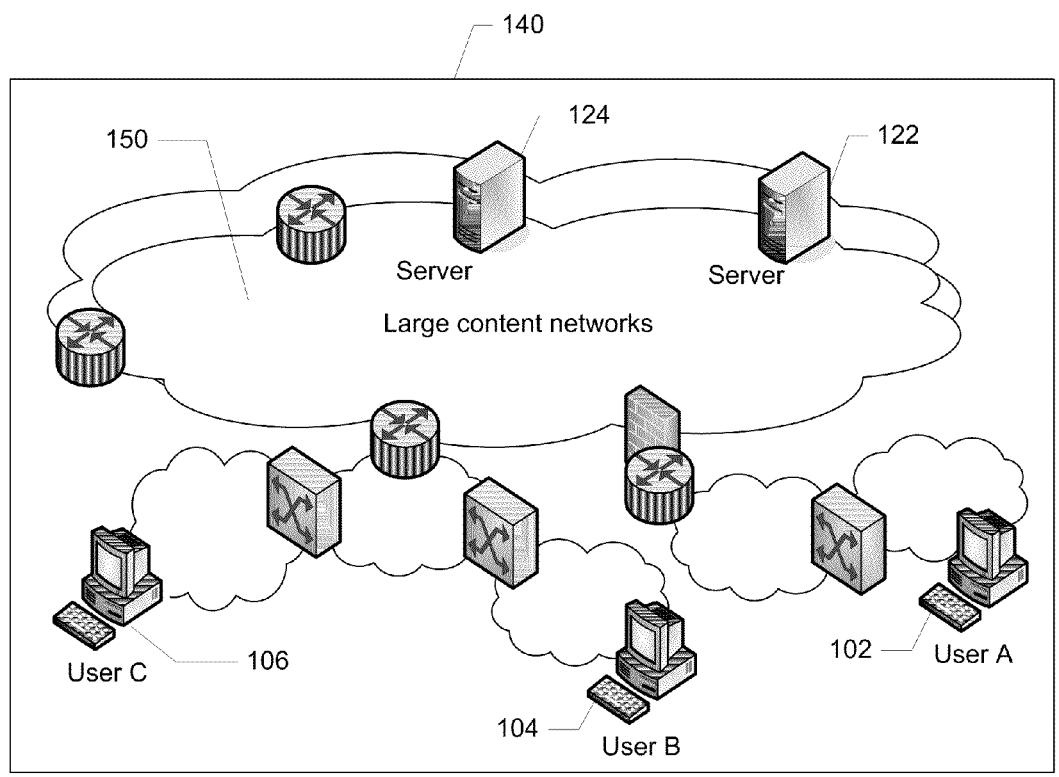
FIG. 1b is a simplified block diagram illustration of an exemplary prior art flat Internet topology of communication network.
Figure 2:
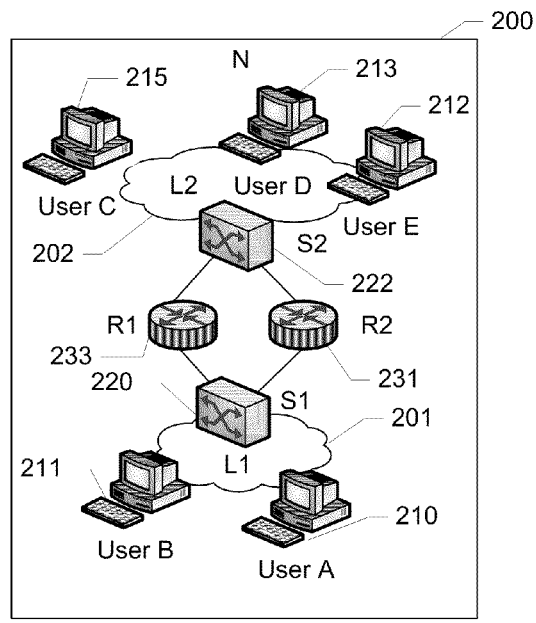
FIG. 2 is a simplified portion of a network diagram illustration of an exemplary communication networks N 200 in which an exemplary embodiment of the present invention can be used.
Figure 3:
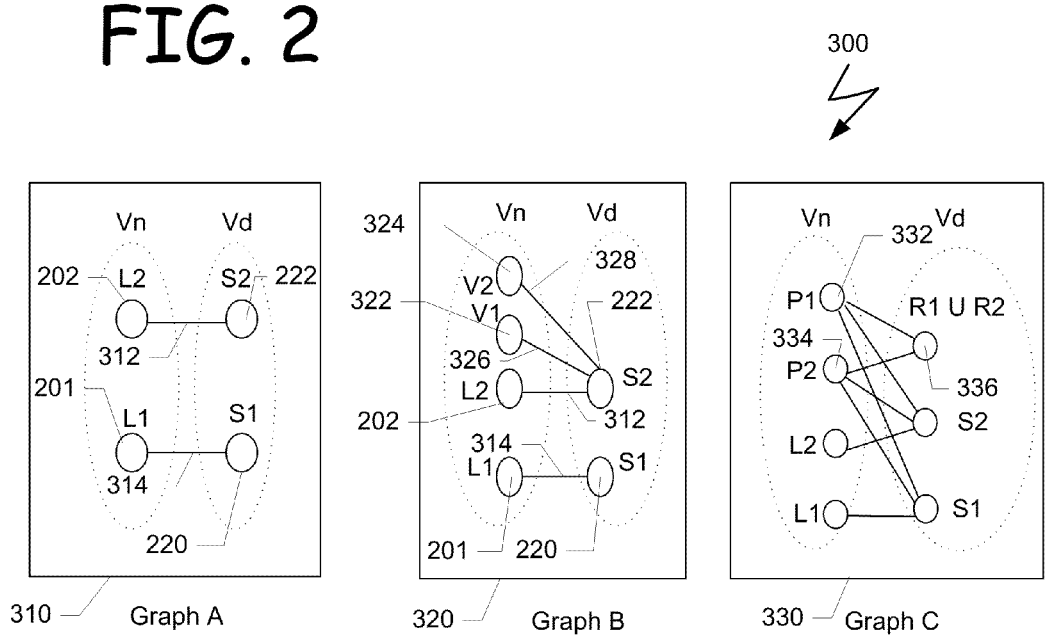
FIG. 3 schematically demonstrates different optional Coupled Promiscuity Networks (CPN) over network N of FIG. 2, according to an exemplary embodiment of the present disclosure.

To illustrate this flow, consider the example of CPN, described in the third example 330 (Graph C of FIG. 3). As mentioned before, we assume that in addition to the networks described in FIG. 2, N 200 includes two more networks: two Peer to Peer (P2P) networks P1 and P2. User A 210 and C 215 belong to P1 and user B 211 and D 213 belong to P2. As previously mentioned, P1 and P2 are CPN under the switch S1 220. The FPOC 600 (FIG. 6) controls the switch S1 220 (FIG. 2), and, given that the new P2P network P2 that has now been discovered, of the P2 network registration process is illustrated in the flow 700 (FIG. 7).

At step 706 of method 700 (FIG. 7), the CPN manager 640 (FIG. 6) updates the estimated networks topology graph and the database with the newly discovered P2 334 (FIG. 3) network and with the estimated connections. At step 708 (FIG. 7), the pre-defined control information on the network is fetched from the network record (if it exists). Because this is an ad-hoc network, no information on this network is provided in advance. At steps 710 and 714 in-band and out-of-band control information are fetched on the network (if it exists). Depending on the P2P protocols, information, such as the networks members, available resources and so on, can be fetched in these steps. In the Peer to Peer Protocol (P2PP), the Join and Leave messages help in understanding the current network members map, together with Peer-Lookup and Update messages regarding the peers routing or neighbor tables. In addition, Replicate and Insert messages can help in understanding the available objects in the network.

This information is saved in the network record in the CPN database 650 (FIG. 6) at step 716. Step 724 deals with updating of counters and statistics possible with the numbers of the members or any other relevant statistics. Non-limiting examples of statistic collections can be: average number of simultaneous sessions, total number of discovered CPN, etc. Finally, at step 726, the CPN manager 640 (FIG. 6) uses the network information to provide the relevant event triggers for this network.

Exemplary event triggers can include, but are not limited to: a notification upon the joining of a new member, a network member leaving, a resource request, and so on. An exemplary optimization that can be performed by the FPOC 600 (FIG. 6) regarding the above example can be: user A 210 (FIG. 2) from P1 332 (FIG. 3) downloading a file from user B 211 (FIG. 2) on network P2 334 (FIG. 3).

Exemplary ongoing network operations can include: statistic and counters updates, monitoring additional events triggers that required updating of the network record in the CPN database, and so on.

Figure 14:
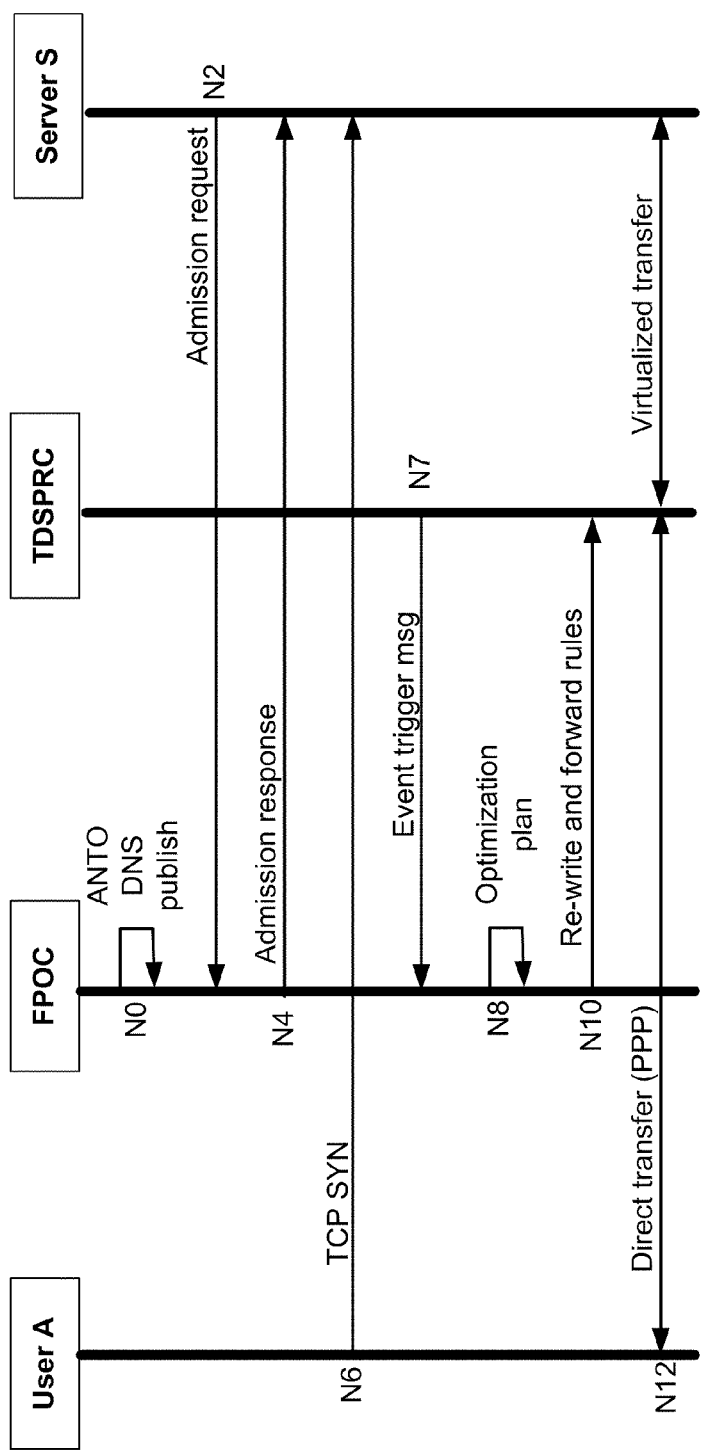
FIG. 14 illustrates a time diagram of an exemplary embodiment of the present disclosure used to optimize a video over HTTP traffic.

Exemplary network registration processes in two optimization examples are provided with conjunction with the description of FIG. 11 and FIG. 14 below.

Figure 8:
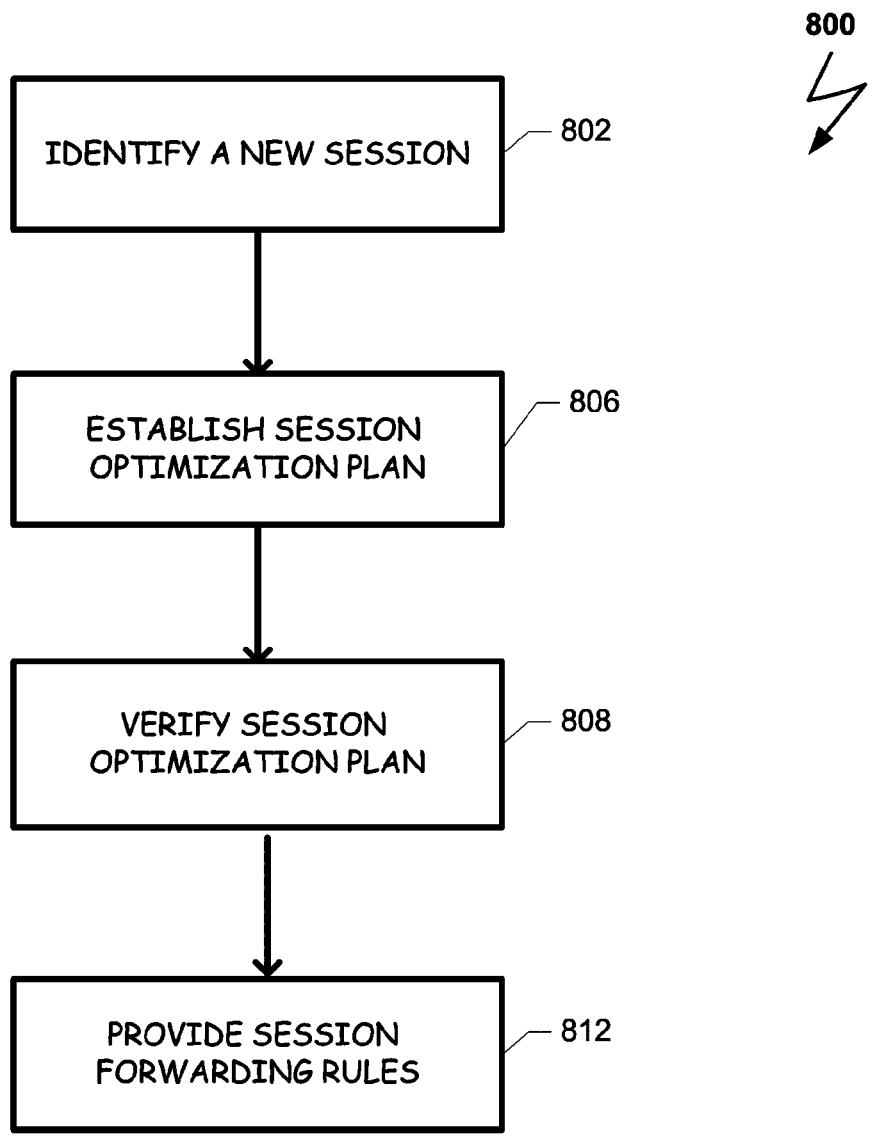
FIG. 8 is an exemplary flowchart with relevant steps of a new session setup process, according to teaching of the present disclosure.

FIG. 8 is an exemplary flowchart depicting relevant steps of an exemplary new session setup process 800. In one embodiment, the method 800 can be executed by the session manager 620 (FIG. 6). Process 800 can be initiated 802 when a new session is identified according to one or more event triggers occurring or being detected on the network, for example. A session can be identified using the first flow of the session or using additional or alternate information.

At step 806, process 800 establishes a session optimization plan by outlining the session optimization requirements to create the session optimization plan, for example. At step 806 method 800 can collect information from different resources. Exemplary resources can be: a network record (the proper context to perform the session virtualization); application control (pre-define, in-band or out-of band); statistics collectors; internal or external counters; and information from admission servers, such as QoS information or bandwidth limits. Additional operations in step 806 can include identification of the session flows, and receiving information on each flow if possible.

Next method 800 verifies 808 that the session optimization plan can be implemented. For example, in one embodiment the session verification may operate to verify the requirements of the QoS, existent of VLAN, etc.

At step 812 method 800 can provide the forwarding rules for each of the discovered session flows. These forwarding rules can be transferred to the control interface block 630 (FIG. 6) to be translated to the proper syntax.

On-going session operations can include statistic and counters updates and monitoring additional events triggers (such as connection, closing, and/or resetting).

To illustrate the data flow of a new session setup process consider the example of a new Real-Time Streaming Protocol (RTSP) session arrival. The new session is identified 802 using configured event triggers such as RTSP SETUP message, for example. Next a session optimization plan is established 806. AN exemplary session optimization plan can be setting a specific QoS level to the media stream. Using RTSP relay help, the session flows are identified in both the uplink and downlink direction. At step 808, the optimization requirements are verified 808. Exemplary optimization requirements can be: statistics such as estimated maximum jitter, averaged bandwidth, etc. According to the information gathered from the RTSP relay, the session manager 620 (FIG. 6) can provide 812 the forwarding rules for each of the stream media flows.

Exemplary session virtualization processes in two optimization examples are provided in conjunction with the descriptions of FIG. 11 and FIG. 14 below.

CPN traffic optimization example: P2P traffic over a broadband access network

An exemplary traffic optimization done by FPOC 410 (FIG. 4) can, as an example, include: reducing the traffic load and the files download times in different types of networks, for example in a P2P network.

In common P2P networks, an acceleration of files download will be a valuable improvement for the peers. The downloading experience of the users will improve due to faster response time (faster file download). The traffic load over the broadband infrastructure will also improve because the traffic load over it will be reduced. An exemplary embodiment of flow path optimizer and creator (FPOC) over P2P network is disclosed below in conjunction with FIG. 9.

Figure 9:
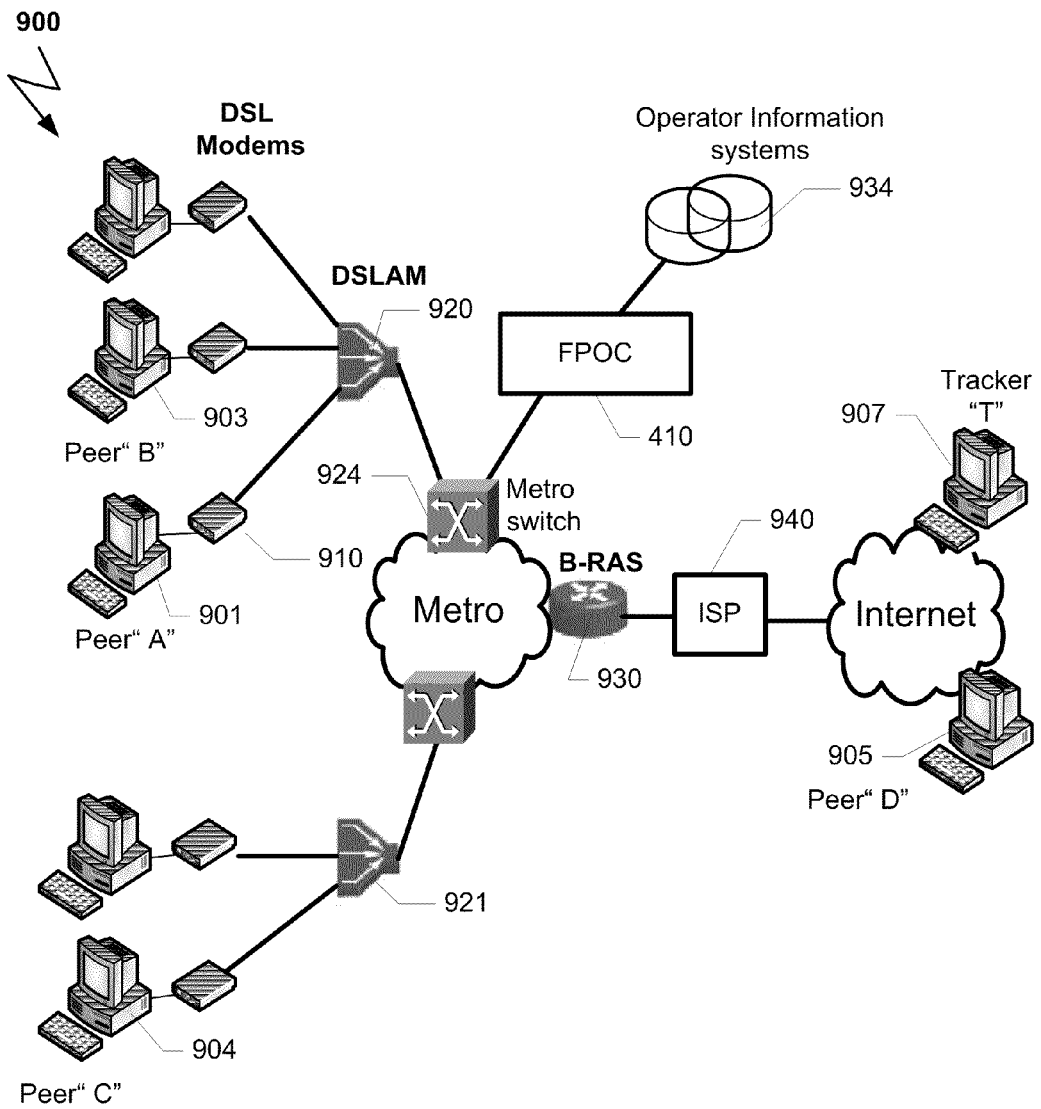
FIG. 9 is a simplified block diagram illustration of an exemplary embodiment of the present disclosure used to optimize P2P traffic.

FIG. 9 is a simplified network diagram illustrating an exemplary portion of a common P2P network 900 in which an exemplary embodiment of an optimizer can be used. Exemplary P2P network can be a BitTorrent or an eDonkey, etc, over a broadband access network, such as Digital Subscriber Line (DSL) for example. In a common P2P network 900 if a peer "A" 901 wishes to download a file "X" it relies on a tracker "T" 907 to find other peers and to find out what chunks of the file "X" they have. A few chunks of file "X" can be located in peers nearby "A", such as the peer "B" 903 and the peer "C" 904 for example. More chunks of file "X" can be located on far peers, such as peer "D" 905 for example.

An exemplary FPOC 410 can control a metro switch 924 in a DSL network, for example. Metro switch 924 can handle the traffic arriving from the Digital Subscriber Line Access Multiplexer 920 and/or 921 (DSLAM) in a DSL network, for example. DSLAM 920 can aggregate the traffic received from users "A" 901 (via a DSL modem 910, for example) and "B" 903. The metro switch 924 can be the TDSPRC set of the P2P network 900. For reasons of simplifying the description of the current embodiment, the controlled metro switch 924 can be capable of frames processing and re-writing frame capabilities, that is, the metro switch is the TDSPRC. In an alternate embodiment, a simple metro switch 924 can be supported by an external device having re-writing capacities for processing and re-writing frames, such as, but not limited to, a NAT (CISCO PIX, for example), or SBC (AcmePacket Net-Net 4000, for example) or DPI (Cisco SCE, Allot NetEnforcer, Sandvine PTS 8210, for example). Thus metro switch 924 and the external device can be referred to as TDSPRC and can rewrite at least one of the original headers of the flow, or remove at least one of the headers of the flow, and by doing so change the path through which the flow will be carried.

Users (such as peer "A" 901, peer "B" 903, and so on) can be connected to a Broadband Remote Access Server 930 (BRAS) using a Point-to-Point Protocol over Ethernet (PPPoE) in a DSL network, for example. B-RAS 930 can decapsulate the tunneling headers and send pure IP traffic to an Internet Service Providers 940 (ISP). A broadband operator (not shown in the picture) can provide Internet services or connect end user to other ISPs (not shown in the picture).

The FPOC 410 can receive additional information regarding the broadband operator networks from operator information systems 934, for example. Exemplary operator information systems 934 can be: a configuration management system, a user profile system, a directory and naming system, and so on. Exemplary additional information can be used for defining CPN, TDSPRC and users that can be used in an optimization plan.

Furthermore, the FPOC 410 can communicate with a global database 454 (FIG. 4). The FPOC 410 can use such databases to receive information on the P2P network or in the other direction to publish its own information to be used by the trackers and peers, for example.

Tracker 907 can serve as an application control server 462 (FIG. 4). Tracker 907 can help the FPOC 410 with the optimization plan of P2P sessions, for example. In an alternate embodiment of a P2P network in which there is no tracker, one or more peers can act as an application control server 462 with respect to the FPOC 410. Tracker 907 can also serve as a P2P network admission control server 464 (as shown in FIG. 4). In an alternate embodiment an external entity or one or more peer nodes can act as an admission control server 464.

The FPOC 410 can also assist tracker 907 in retrieving additional information on peers from either the broadband operator databases 934 or from the FPOC's 410 databases (both with the proper admission mechanism), for example. This information can be used in the tracker calculations. Calculations such as, but not limited to: calculation of proximity, calculation of available bandwidth, etc.

The FPOC 410 can also perform operations similar to an iTracker in a P4P (Proactive network Provider Participation for P2P, also known as Provider Portal for P2P) technology. Operations such as, but not limited to providing additional information from an ISP network, on the operators networks, for optimizing traffic before the traffic enters an ISP 940 network. Further, to the known operations detailed above, the exemplary FPOC 410 raises the networks capabilities by changing P2P traffic path decisions using the FPOC's virtualization process. The virtualization process enables the utilization of the CPN carried over different OSI layer than the P2P network. This operates to broaden the number of paths to be calculated in the optimization. In this example, a path over OSI layer 2 (the Ethernet network) is used for serving a P2P network, which is an OSI layer 7 network. The benefits from the virtualization process can be: shorter traffic paths, gaining traffic offload in critical points on the broadband operator network, shorter download times as demonstrated in conjunction with FIG. 10, and so on.

Figure 10:
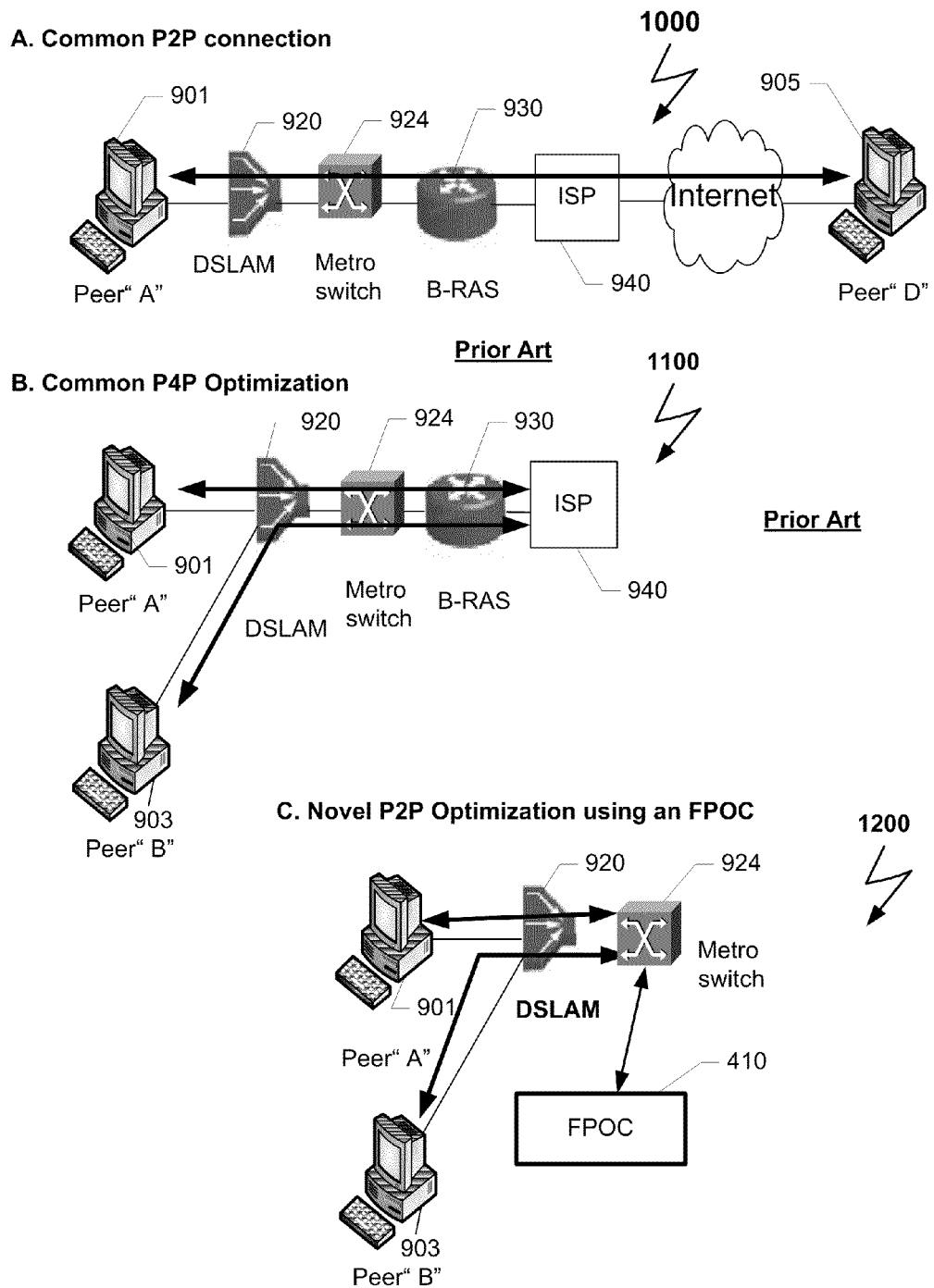
FIG. 10 schematically demonstrates the benefits of an exemplary optimal P2P path according to an embodiment of the present disclosure compare to prior art paths.

Reference is now made to FIG. 10 which illustrates the advantages of the exemplary embodiment of the P2P network in comparison to two prior art P2P traffic paths: (a) an exemplary classic common P2P path 1000; (b) an exemplary optimized P4P path 1100; and (c) an exemplary optimized virtualized path 1200 that is created by an exemplary embodiment of FPOC 410 and presented in comparison to the common techniques illustrated in (a) and (b). As can be seen in FIG. 10 (c) FPOC 410 can reduce the traffic in some of the operator known bottlenecks such as at BRAS 930, in a DSL network, for example. Also FPOC 410 can shorten the traffic path immensely compared to the P4P traffic 1100 or other prior art optimized P2P traffic between peer "A" 901 and peer "B" 903. In the prior art P4P 1100, the traffic might travel all the way to a first Internet router (ISP network 940) and only from there be routed to Peer B 903, for example.

In its traffic optimization plan, the FPOC 410 can use information on the user geographic location and the broadband operator network topology. An exemplary embodiment of shorting a traffic path by FPOC 410 is illustrated in 1200 (FIG. 10). FPOC 410 can configure the controlled TDSPRC (metro switch 924 FIG. 10) to copy to FPOC 410 a frame related to an initialization of a PPP session (PPP link establishment phase messages, for example) and/or a P2P Connection establishment messages, for example. For the simplicity of this P2P optimization example, we assume that the metro switch is capable of identifying such messages. Nevertheless, the FPOC can be associated with an external device in order to process the frame and collect this information. An exemplary external device can be a DPI server, for example. In this case, the TDSPRC comprises of both the metro switch and a DPI server. Additional exemplary messages can involve information discovery on P2P networks such as offer-files message in eMule protocol, which may help FPOC 410 with future traffic optimization plans.

FPOC 410 can then wait for a new network message. Exemplary new network message can be: when peer "A" 901 (FIG. 10) establishes a PPP link with BRAS 930 (FIG. 10) in a DSL network, for example. Because controlled metro switch 924 (FIG. 10) is a TDSPRC, it passes all the traffic from user (peer) "A" 901 (FIG. 10), and since the messages fit the previous configuration rules, then these messages can be copied to FPOC 410. At this state FPOC 410 can perform a new CPN registration process (described below). At the end of the new CPN registration, FPOC 410 can configure additional new rules, which are relevant to new sessions on the discovered network. For example TCP connection establishment (SYN message), etc.

Next FPOC 410 can wait for either additional new network messages and/or new sessions on existing networks. For example, user "B" 903 (FIG. 9) establishes a PPP link with BRAS 930 (FIG. 9) in a DSL network, for example. FPOC 410 can discover this new network, and perform registration of this new discovered transitive CPN and re-configure the controlled metro switch 924 to copy the relevant messages on this network to the FPOC ports as well.

as an example, suppose user (peer) "A" 901 logs in to the P2P network and user "B" 903 logs in to the P2P network. For purposes of simplifying the description, both of user "A" and "B" perform the registrations at the same server peer (not shown in FIG. 10). The promiscuous controlled metro switch 924 can be configured to copy such messages to FPOC 410 and a new network registration processes can begin again. At the end of these processes FPOC 410 holds information on three CPN: PPP between user "A" 901 and the BRAS 930, PPP between user "B" 903 and BRAS 930, and P2P of the server with user "A" 901 and user "B" 903. In a DSL network, for example.

The CPN between user "A" 901 and BRAS 930 is carried over OSI layer 3 and 4 (network and transport protocols), while the CPN between the user "A" 901, the user "B" 903, and the server peer is carried out over OSI layer 7 (application layer). Consequently, FPOC 410 enables three optional paths that the data from A to B can be transferred through in addition to the one trivial P2P path. If a new message, regarding a new session over a registered network, arrives FPOC 410 can perform a session virtualization process. Meaning create an optimized path for the session, one from the additional new CPN. For example a shorter path can be created for the P2P connection as shown in 1200. The flow is transferred from user A 901 to user B 903 via the DSLAM 920 and the metro switch 924. Thus reducing the data traffic to and from B-RAS 930 and ISP 940. The session virtualization process of the P2P optimization example is described in detailed in conjunction with FIG. 11 below.

When user "A" 901 and user "B" 903 are connected to P2P network, messages such as offer-files message might trigger additional state changes in FPOC 410 and additional information on the CPN can be collected during network update process.

An exemplary embodiment of a network registration process is illustrated at this section. Two types of CPN exist in the P2P example detailed above in conjunction with FIG. 9: (i) a PPP network between a user and the BRAS in a DSL network, for example (PPP between user "A" and the BRAS, PPP between user "B" and the BRAS 930) and (ii) P2P of the server peer with user "A" and user "B"; additional node in this network is a tracker 907 (FIG. 9) which can serve as an application control server and an admission control server of this P2P network.

An exemplary PPP network registration process can be performed as follow: The network discovering is performed using the configured forwarding rules of a controlled metro switch 924 (FIG. 9). An estimated networks topology graph with the new PPP network and with the controlled metro switch 924 as the TDSPRC that transmits data to and from the three new CPN. Since this is a PPP network with a user known to the DSL operator, there might be some pre-defined information on this network, from the DSL operator information systems. Information such as: user package, user geographic location, for example. If not, some out-of-band information on the user might be fetched from the operator systems. After the FPOC 410 databases are updated, some counters and statistics can be updated by FPOC 410 as well, such as number of active users for example. Some event triggers and forwarding rules can be configured to the controlled metro switch 924, TCP connection establishment (SYN message), for example.

An exemplary P2P network registration process can be performed as follows:

(a) A network discovering process is performed using configured forwarding rules of a controlled metro switch 924;

(b) An estimated networks topology graph can be updated with a new P2P network and with the controlled metro switch 924 as the TDSPRC that transmits and receives the network traffic—because this is a P2P network, no pre-defined information on this network exists.

(c) Some in-band information on the network can be collected (step 710, FIG. 7).

(d) In addition, out-of-band information can be collected from the tracker, for example (step 714) information on the peer privileges.

(e) Different databases and statistics can be updated and the proper forwarding rules can be set to the controlled metro switch, including P2P relevant messages, for example, as described below in conjunction with FIG. 11.

Figure 11:
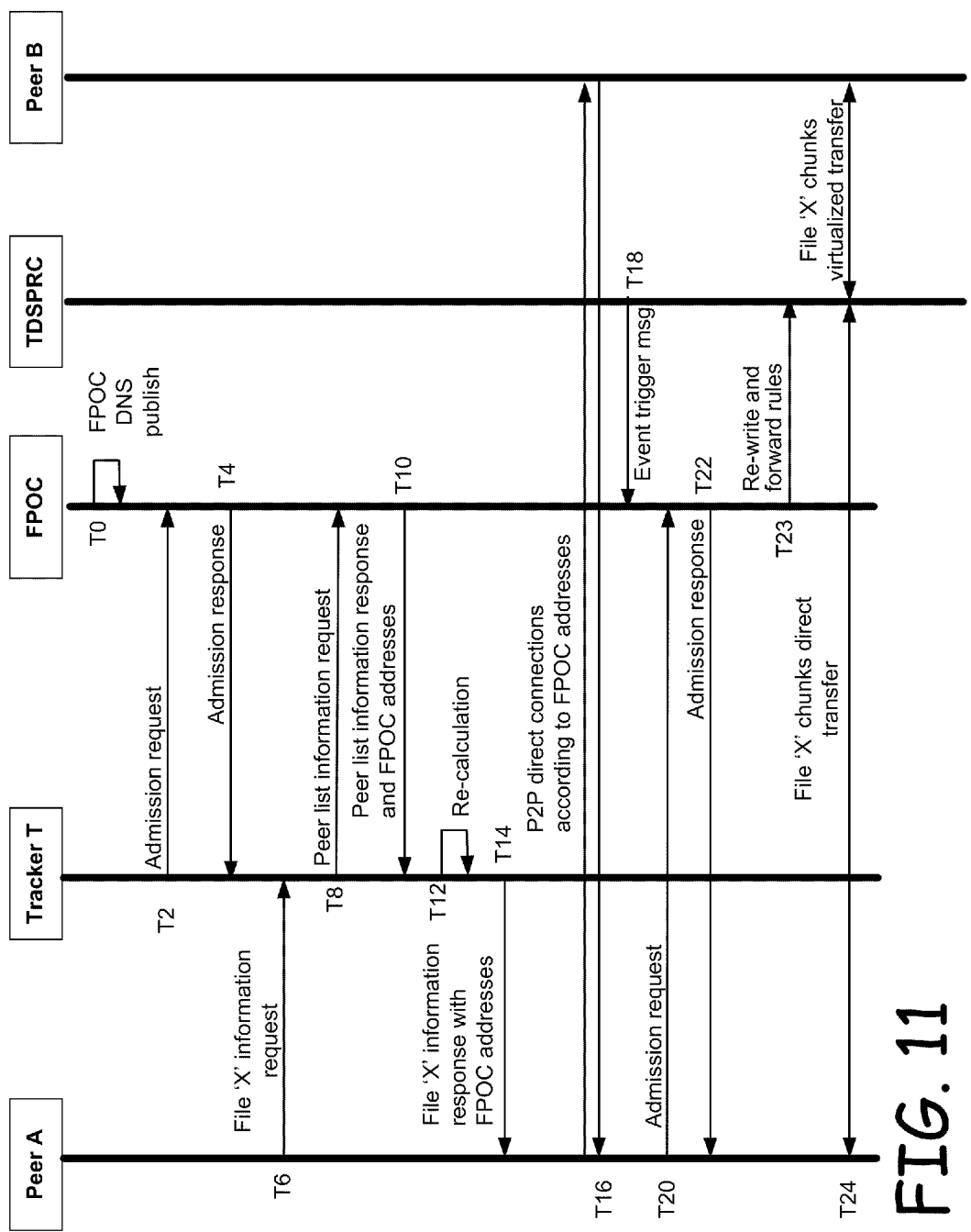
FIG. 11 illustrates a time diagram of an exemplary process of an embodiment of the present disclosure used to optimize P2P traffic.

The detailed data flow of the P2P traffic optimization is described in FIG. 11. FIG. 11 illustrates a time-line diagram having five axes that represent components involved in an exemplary session virtualization process 530 (FIG. 5): Peer 'A', Tracker 'T', FPOC 410, TDSPRC (metro switch), and Peer 'B'. To simplify the example, it is assumed that the FPOC 410 publishes, at T0, its communication information using, for example, a global data base, such as DNS (Domain Name Service). In addition, we assume that the TDSPRC (metro switch) is configured to identify event triggers such as connection establishment message with the published FPOC 410 addresses. At T2 the tracker requests a trust relation with the FPOC 410 using some admission mechanism and the response is sent at T4. Once the peer "A" looks for information on a specific file "X" and contacts the tracker "T" at T6, the tracker "T" generates an information request on the list of peers that hold some of "X" chunks and sends it on T8 to the FPOC. Assuming that relevant information exists within the FPOC 410 database or within some other databases that the FPOC can contact, the peers information is sent back T10 to the tracker. This information might include geographic information, relevant network resources information, etc. The tracker then re-calculates T12 its functions (efficiency and locality, for example) and sends T14 the proper response to peer "A". This response can include some information regarding the FPOC 410 operation, for example instructions to use known IP addresses. Note that in fact, with respect to the FPOC, any peer node can replace the tracker role.

Peer "A" uses the information and creates a direct connection with, for example, peer "B" at time T16, using the FPOC manageable addresses. Once the connection establishment messages arrive at the TDSPRC, the corresponding notification is sent to the FPOC at time T18. Then, optionally, additional admission phase is performed with peer "A" at time T20, with the response T22. These steps might serve for requesting a specific QoS level, for billing issues and etc. The FPOC 410 identifies the traffic using the known addresses as candidates for optimization (according to user "B" destination address in the IP header, for example). This step corresponds to step 802 in FIG. 8. Two flows are associated with this P2P session: in one direction a flow from user "A" to user "B" and in the other direction a flow from user "B" to user "A". Note that these two flows are ingress flows to the metro switch 924 (FIG. 9).

The FPOC identifies the above mentioned two flows associate with the P2P session (for example bi-directional TCP connection) and generates the optimization plan for both flows (step 806 in FIG. 8). The optimization plan consists of routing the traffic between peer "A" and peer "B" using the shortest path between them, for example. To execute its optimization plan, the exemplary FPOC uses its virtualization process. this means, the FPOC 410 instructs the metro switch 924, at T23, to re-write the flows frames. (The Ethernet frame re-writing details are described in the paragraphs below) and provides the new session forwarding rules (step 812 in FIG. 8). Then, the metro switch directs the frames according to the new address to the optimized path and the optimization process is done. Consequently the "heavy data traffic" between "A" and user "B" does not have to pass through the B-RAS 930 and ISP 940 (FIG. 9), instead it directly passes from "A" to "B" through the metro switch 924. In this example switching the frames between user A and user B are executed by the metro switch according to OSI layer 2 addresses, in contrary to a common transportation between A and B wherein the routing is executed according to IP address information in layer 3.

Consider the flow in the direction from user "A" to user "B" in a DSL network, for example. The frames in this flow can include an Ethernet header with the values of User "A" MAC address as Source Address (SA) and the BRAS MAC address as the Destination Address (DA). In addition, its PPP tunnel refers to a connection between user "A" and the BRAS. Within the encapsulation (PPPoE encapsulation), the IP addresses are User "A" IP (source) and user "B" IP (destination). In the second flow, from user "B" to user "A", the Ethernet header can include values of user "B" MAC address as Source Address (SA) and the BRAS MAC address as the Destination Address (DA). The PPP tunnel in this flow refers to a connection between the user "B" and the BRAS. Within the encapsulation (PPPoE encapsulation), the IP addresses are user "B" IP (source) and user "A" IP (destination).

According to the present disclosure, the frames re-writing in the flow from user "A" to user "B" in a DSL network, for example include replacing the DA in the Ethernet header from the BRAS MAC address to the user "B" MAC address. In addition, the PPP tunneling is replaced from tunneling between the user "A" and the BRAS with the tunneling between the user "B" and the BRAS. The re-writing in the second direction is done vice versa.

CPN traffic optimization example: HTTP video traffic over a broadband access network Additional exemplary traffic optimization done by FPOC 410 (FIG. 4) can be: optimizing video traffic arriving from an HTTP server to a broadband user. In a typical broadband connection over a broadband network an acceleration of video files download will be a valuable improvement for the users. The video experience of the users will improve due to faster response (faster file download). The traffic load over the broadband access network will also improve, since the traffic load over certain segments of the connection will be reduced. An exemplary embodiment of an FPOC 410 in an HTTP video traffic is disclosed below in conjunction with FIG. 12.

Figure 12:
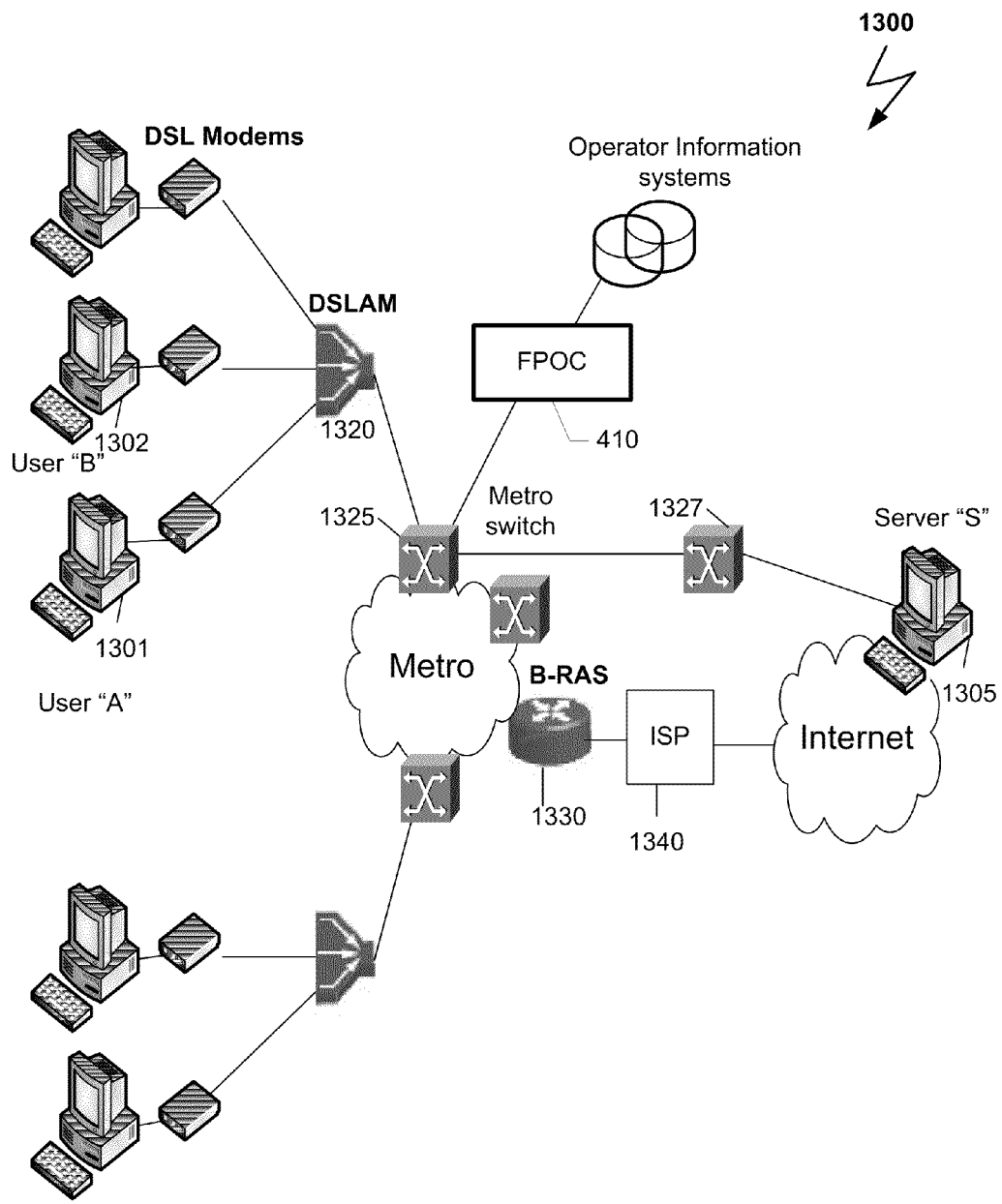
FIG. 12 is a simplified block diagram illustration of an exemplary embodiment of the present disclosure used to optimize video over HTTP traffic.

FIG. 12 is a simplified block diagram illustration of an exemplary portion of a common HTTP video traffic 1300 in which an exemplary embodiment of the optimizer can be used. Assume that a user "A" 1301 wishes to view a video file "V", located at a web server "S"1305. The video file "V" can be an SWF object for example, which can be a part of a web page "P" which can be located on "S". To view the video, the user "A" 1301 can browse to the page "P" using its browser program. Then, usually, the browser program can generate an HTTP request to each of "P" objects. Since "V" is one of these objects, the file "V" can be downloaded too. Afterward, the browser program can activate a video player program to play the video.

Similar to the previous P2P example, an exemplary FPOC 410 can control the nearest metro switch 1325 handling the traffic from the DSLAM 1320 which aggregates the traffic of user "A" 1301 in a DSL network, for example. The promiscuous metro switch 1325 may have re-write capabilities or may be associated with an external device that has re-write capabilities, therefore metro switch 1325 can be referred as a TDSPRC. Metro switch 1325 can be similar to the TDSPRC 422 of FIG. 4. Recall that in such a DSL network, the user is connected to the BRAS 1330 using PPPoE and the BRAS 1330 can de-capsulate the tunneling headers and send pure IP traffic to an ISP 1340. When traffic is not optimized, the BRAS 1330 passes the HTTP traffic to the ISP 1340 and the ISP 1340 routes the traffic to the web server "S".

The FPOC 410 can be connected to a global database 454 of FIG. 4. The FPOC 410 can use such databases to receive information on the content network of the server "S" or in the other direction to publish its own information to be used by the web servers as the application control server 462 (FIG. 4).

In this example, a web server 1305 is similar to the application control server 462 of FIG. 4. The web server 1305 can help the FPOC 410 with the optimization plan of the video traffic. The web server 1305 can also serve as the private network admission control server 464 (FIG. 4). However, the admission control role can be assigned to an external entity too.

Figure 13:
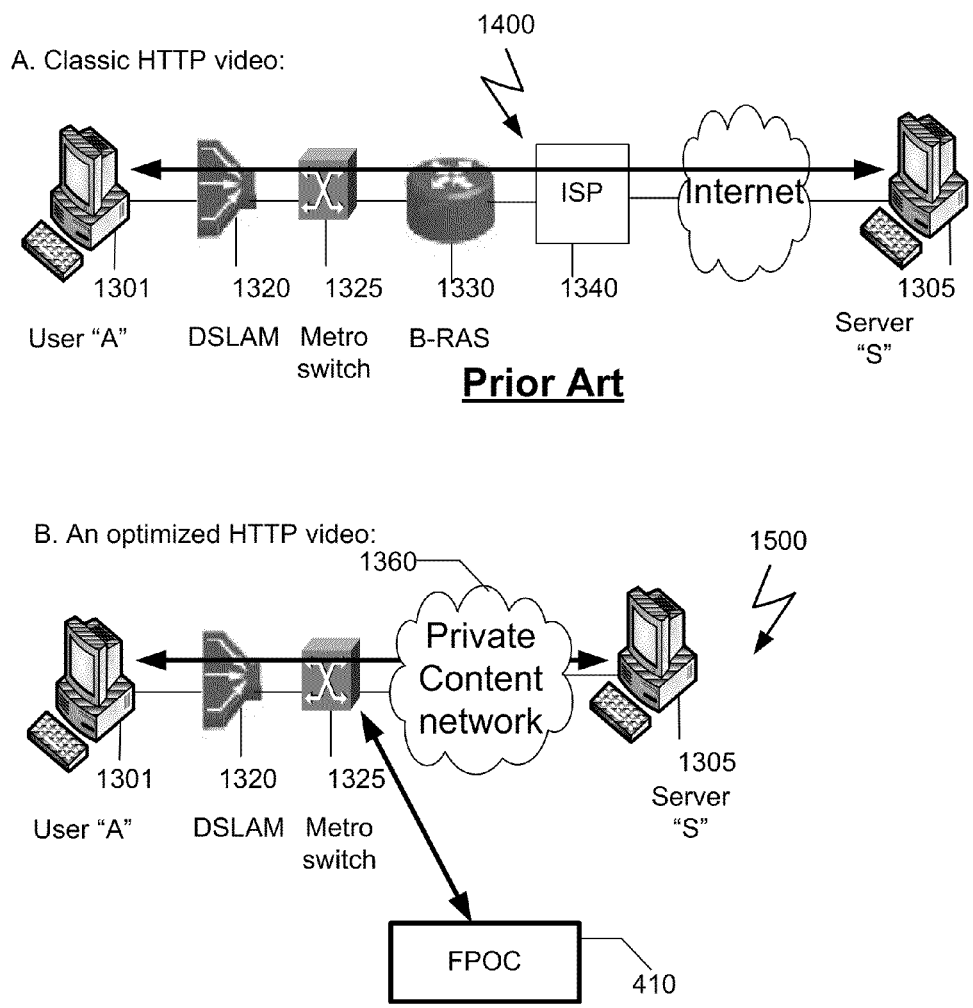
FIG. 13 schematically demonstrates the benefits of an exemplary optimal video over HTTP path according to an embodiment of the present disclosure compare to prior art paths for video over HTTP traffic.

Reference is now made to FIG. 13 that illustrates the benefit of the exemplary embodiment of the FPOC 410 in CPN 1500 compared to a common HTTP video traffic 1400 in a DSL network, for example. The FPOC 410 can contribute by directing the traffic to the short path 1500 using the content network 1360 devices compared to the common prior art long path 1400 through the ISP network 1340 and operator BRAS 1330 as described in FIG. 13a. As can be seen, operating the FPOC 410 can reduce the traffic in some of the operator known bottlenecks, such as BRAS 1330. An additional benefit expected from this traffic manipulation is shorter download times.

The FPOC 410 can be implemented as described in FIG. 5. In this example, we assume that the server "S" 1305 and the FPOC 410 have a trusted relationship which has been established using some authentication mechanism, and the FPOC CPN database (not shown in figure) is pre-defined with the server "S" 1305 private content network information.

In this example, FPOC 410 can configure the controlled metro switch 1325 (in state 504 of FIG. 5) to copy the following messages to the FPOC 410 ports: Any frame related to the initialization of a PPP session (PPP link establishment phase messages) and any TCP connection establishment (SYN message) request to the specific IP address of server "S" 1305. Then, the FPOC 410 FSM 500 (FIG. 5) can move to state 506 and can wait for a new network message. Assume that user "A" 1301 establishes its PPP link with the BRAS 1330. Because the controlled metro switch 1325 passes all the traffic from user "A" (and having promiscuous capabilities), and the messages fit the previous configuration rules, these messages are copied to the FPOC 410 and the FSM 500 moves to state 512. At this state, the FPOC can perform its new CPN registration process. This process can be performed as described in method 700. At the end of this state, the FPOC 410 can configure additional new rules to the controlled metro switch 1325 that are relevant to new sessions on the discovered network. In this example, the new rules can include any TCP connection establishment (SYN message) having the relevant source and destination IP addresses, for example.

Then, the FSM 500 can move to state 516 (of FIG. 5) and can wait for either additional new network messages or new sessions on existing networks. User "A" 1301 can now browse to page "P" of server "S" 1305. The user establishes a TCP connection with the server "S". Because the messages fit the previous configuration rules of the controlled metro switch, the message is copied to the FPOC 410 and the FPOC FSM can move to state 530. At state 530, FSM 500 can perform a session virtualization process 530. An exemplary description of the session virtualization process 530 of the HTTP video optimization example is given in detailed in FIG. 14 below.

In this example two types of CPN exist: (i) a PPP network between a user and the BRAS 1330 and (ii) A private content network 1360.

The PPP network registration process is described in the P2P optimization example. The private content network 1360 registration process can be performed as follows. One way can be to pre-define the network information in the FPOC database after the proper authentication process. Additional option (not assumed in this example) can be to discover the network using either in-band or out-of-band control information from the application control at the web server (steps 710 and 714).

The discovery of a private content network 1360 using in-band control information can be performed in this example via HTTP headers such as specific values in the server cookie header, for example. In this case, the private content network discovery can be more complicated. The FPOC 410 can configure the controlled metro switch 1325 to copy all messages in the proper direction (from the BRAS 1330 to the user 1301) and process the frames to parse this HTTP header. Once the cookie value matches the specified value, the network registration process can start.

The discovery of a private content network using out-of-band control information can be done in the following manner. The FPOC 410 can publish its addresses in global databases such as DNS, for example. The application control server (the web server, in this example) that wishes to contact the FPOC can generate an admission request and after a positive response (similar to the mechanism of FIG. 14 below) the direct control channel between the application control entity and the FPOC can be established using Session Description Protocol (SDP) format, for example. Using the control channel, the application can instruct the FPOC how to discover any relevant network traffic.

In all the cases, in step 706, the estimated networks topology graph can be updated with the new private content network 1360 (that can be connected to the metro network via a switch 1327) and with the controlled metro switch 1325 as the TDSPRC. Again, the database and statistics can be updated and the proper forwarding rules can be set to the controlled metro switch, consisting of TCP connection establishment messages only in this example.

The detailed data flow of the HTTP video traffic optimization is described in FIG. 14 below. FIG. 14 illustrates an exemplary session virtualization process 530 (method 800). To simplify the example, we assume that the FPOC 410 has published its communication information using, for example, a global database, such as DNS at N0. The web server 'S' 1305 can establish a trust relation with the FPOC 410 using some admission mechanism at N2 and N4. Then, the private content network 1360 information can be received by the FPOC (using pre-defined information or out-of-band control as described before). As a result, at this point the FPOC CPN database includes the server "S" private content network 1360 information, such as server IP address, server MAC address, metro switch 1325 as TDSPRC, connecting switch 1327, VLAN ID and etc. In addition, we assume that the TDSPRC (metro switch) is configured to identify event triggers such as connection establishment message with the server "S" IP address, for example.

Once the user "A" 1301 starts to browse to page "P", the user browser can generate request for TCP connection establishment N6 with the server "S" 1305. The proper SYN messages can be copied to the FPOC ports (N7 in FIG. 14) according to the configuration rules of the controlled metro switch. For simplicity, we assume that all page objects are located in the same domain with the same server IP. Because the server IP matches the information in the internal database, the FPOC can prepare its optimization plan for this session traffic at N8.

In step 802 of FIG. 8, the session flows are identified. Meaning, for each TCP connection between the user "A" 1301 and the server "S" 1305, two flows are associated with this HTTP session. One flow in the direction from the user "A" to the server "S" and in the other direction a second flow from the server "S" to the user "A". Note that such two flows are both ingress flows with respect to the metro switch.

The FPOC can identify the two flows associate with each TCP connection of the HTTP session and can generate the optimization plan for both flows (step 806 in FIG. 8). The optimization plan can consist of routing the traffic between the user "A" and the server "S" using the path between them within the private content network 1360. To execute its optimization plan, the FPOC 410 can use its session virtualization process. This means that the FPOC can instruct the metro switch 1325 (at N10) to re-write the flows original frame headers (The frame re-writing details are described in the paragraphs below) and provide the new session forwarding rules (step 812 in FIG. 8, steps in FIG. 14). Note that the FPOC can use additional devices to perform the frame re-writing, as mentioned above. Then, at N12 the metro switch 1325 can direct the frames according to the new address to the optimized path (to server "S" via metro switch 1327, for example) and the optimization process is done.

Consider the flow in the direction from the user "A" 1301 to the server "S" 1305. The frames in this flow can include an Ethernet header with the values of user "A" MAC address as Source Address (SA) and the BRAS 1330 MAC address as the Destination Address (DA). In addition, its PPP tunnel can refer to a connection between user "A" and the BRAS. Within the encapsulation, the IP addresses are user "A" IP (source) and server "S" IP (destination). In the second flow, from the server "S" to the user "A", the Ethernet header includes values of the BRAS MAC address as Source Address (SA) and the user "A" MAC address as the Destination Address (DA). The PPP tunnel refers to a connection between user "A" and the BRAS. Within the encapsulation, the IP addresses can be server "S" IP (source) and user "A" IP (destination).

The frames re-writing in the flow from user "A" to server "S" can include replacing the DA in the Ethernet header from the BRAS MAC address to the server "S" MAC address and replacing the SA in the Ethernet header from the user "A" MAC address to the controlled metro switch MAC address. The result of the SA change is that the responding server traffic can reach the controlled metro switch. The PPP tunneling in this direction should be removed. In addition, any information regarding the private content network, such as VLAN tag can be added to the frames. The re-writing in the second direction is done vice versa. That is, the MAC addresses can be replaced to the original address, the tunneling information can be added and the VLAN information can be removed.

Note that in this example, the FPOC deals with one user only. To deal with traffic from many users, the controlled metro switch must use a distribution mechanism (port address translation (PAT), for example), to distinguish between the different flows from the server to the users. For example, consider the user "A" 1301 and the user "B" 1302 in FIG. 12. Both of them can download files from the same HTTP server "S" 1305. Then, according to the above mentioned frame re-write, the frames from the server "S" arrives at the controlled metro switch (the SA MAC address). The controlled metro switch can use PAT to distinguish between the frames associated with user "A" and frames associated with user "B".

Finally, consider a video multi-cast transmission of RTSP of a streaming server. Such traffic can easily be optimized by the FPOC in a similar way to the HTTP video optimization example. However, additional treatment should be added to replace the Internet Group Management Protocol (IGMP) role at the controlled metro switch and to establish the multicast group memberships. The multi-cast traffic stream arrives to the controlled metro switch, and the FPOC can control the transformation of this single traffic stream into multiple uni-cast streams according to the multi-cast group members list. Meaning, the FPOC can hold a group table with all multi-cast group members' details similar to IGMP.

In the description and claims of the present application, each of the verbs, comprise, include, have, and conjugates thereof, are used to indicate that the object or objects of the verb are not necessarily a complete listing of members, components, elements, or parts of the subject or subjects of the verb.

In this application the words module, unit, and block are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramification and variations are possible within the teaching of the embodiments comprising different combinations of features noted in the described embodiments.

It will be appreciated by persons skilled in the art that the present invention is not limited by what has been particularly shown and described herein above. Rather the scope of the invention is defined by the claims that follow.

What is claimed is:

1. A method for creating a transitive optimized path for a flow, comprising:
   maintaining a topology database of collective virtual networks (CVNs) by collecting topology information related to three or more of different Open System Interconnection (OSI) model layers from a plurality of network devices, wherein a CVN connects devices working in networks that belong to different OSI layers;
   identifying a new flow establishment to be carried over a first path;
   identifying, based at least in part on information from the CVN database, a Transmitting Device Set with Promiscuous and Re-writing Capabilities (TDSPRC) that transfers the new flow;
   defining two or more coupled promiscuity networks (CPN) for carrying the new flow, wherein the traffic over the two or more CPNs passes through the TDSPRC and wherein at least one coupled network within a particular CPN differs from at least one other coupled network within any of the two or more CPN in at least one network characteristic;
   planning, based at least in part on information from the CVN database, an optimized path, other than the first path, for the new flow; and
   directing the new flow through the planned optimized path by utilizing the TDSPRC to rewrite at least one original header of a frame of the new flow.

2. The method of claim 1, wherein the act of rewriting at least one original header of a frame further comprises deleting at least one encapsulation header from the original header of the frame of the new flow.

3. The method of claim 1, wherein the at least one original header of a frame is a Point-to-Point Protocol over Ethernet (PPPoE) tunneling header.

4. The method of claim 1, wherein the at least one original header of a frame of the new flow is an Open System Interconnection layer 2 header.

5. The method of claim 1, wherein the act of directing the new flow further comprises controlling said one or more TDSPRCs to transfer the new flow according to the optimized path.

6. The method of claim 1, wherein the act of directing the new flow comprises sending control commands to the TDSPRC.

7. The method of claim 1, wherein the TDSPRC is associated with a metro switch.

8. The method of claim 7, wherein the metro switch is associated with a frame-processing device.

9. The method of claim 8, wherein the frame-processing device is a deep packet inspection device.

10. The method of claim 1, wherein the act of planning an optimized path further comprises the act of planning an optimized path based on latency criteria.

11. The method of claim 1, wherein the at least one network characteristic is selected from a group consisting of the OSI application layer and the OSI session layer.

12. The method of claim 1, wherein the new flow establishment is of a Peer-to-Peer session.

13. The method of claim 12, further comprising: changing a layer 2 destination frame address from an address of a Broadband Remote Access Server to a layer 2 address of another peer.

14. The method of claim 6, wherein the act of sending control commands to the TDSPRC further comprises sending a rewrite-header command.

15. A system that creates an optimized path for a flow, comprising:
   a flow-path-optimizer-and-creator;
   a plurality of collective virtual networks (CVNs), wherein a CVN connects devices working in networks that belong to different Open System Interconnection (OSI) model layers; and
   one or more Transmitting Device Set with Promiscuous and Re-writing Capabilities (TDSPRCs);
   wherein the flow-path-optimizer-and-creator is configured to collect topology information related to three or more different OSI layers from a plurality of network devices working in different OSI layers, define two or more coupled promiscuity networks (CPN) from the plurality of CVNs according to the one or more TDSPRCs, plan, based at least in part on the collected topology information related to three or more different OSI layers, an optimized path, instead of a trivial path, for a flow, and instruct the one or more TDSPRCs to rewrite at least one of an original header of a frame as a rewritten header of the flow in order to create and transfer the flow through the optimized path instead of the trivial path; and wherein the traffic over two or more CPNs passes through the one or more TDSPRCs that transfer the flow according to the rewritten header of the flow.

16. The system of claim 15, wherein at least one CVN differs from another CVN by operating at a different OSI layer selected from a group consisting of the OSI application layer and the OSI session layer.

17. The system of claim 15, wherein one of the one or more TDSPRCs is associated with a frame processor.

18. The system of claim 15, wherein the flow-path-optimizer-and-creator is configured to rewrite at least one of an original header of a frame of the flow by deleting at least one encapsulation header of an original frame of the flow.

19. The system of claim 15, wherein the one or more TDSPRC comprises a metro switch.

20. The system of claim 15, wherein the flow is a peer-to-peer flow.

21. A flow-path-creator-and-optimizer, comprising:
an interface controller;
one or more session managers;
a coupled promiscuity networks (CPN) manager; and
a database of topology information;
wherein the interface controller is configured to interface between a plurality of network devices and internal units of the flow-path-creator-and-optimizer;
wherein the CPN manager is configured to collect topology information related to three or more different Open System Interconnection (OSI) model layers from a plurality of network devices working in different OSI layers, store the collected topology information in the database of topology information, and dynamically maintain the database of topology information on collective virtual networks (CVNs), wherein a CVN connects network devices working in networks that belong to different layer OSI layers, and one or more Transmitting Device Set with Promiscuous and Re-writing Capabilities (TDSPRC), perform network registration processes, and update the database of topology information; and
wherein the one or more session managers plans, based at least in part on information from the CVN database, a session optimization path, instead of a trivial path, over two or more coupled promiscuity networks (CPN), based on the database of topology information and accordingly creates a session virtualization process by controlling a selected TDSPRC to rewrite at least one header of an original frame of a flow, generates a session's flows forwarding rules and transfers the session's flows forwarding rules to the selected TDSPRC.

22. The flow-path-creator-and-optimizer of claim 21, wherein the interface controller further comprise a translator that translates data received from the plurality of network devices before transferring them to internal units of the flow-path-creator-and-optimizer.

23. The flow-path-creator-and-optimizer of claim 22, wherein the data comprises forwarding rules transmitted toward the selected TDSPRC.

24. The flow-path-creator-and-optimizer of claim 23, wherein the selected TDSPRC is associated with a frame processor device.

25. The flow-path-creator-and-optimizer of claim 21, wherein the flow-path-creator-and-optimizer publishes in a Domain Name Service (DNS) its optimization addresses.

26. A method to optimize information delivery between a first node on a first network and a second node on the same or different network, the delivery being made through a networked system in which one or more paths between the first node and the second node are known and, through a Transmitting Device Set with Promiscuous and Re-writing Capabilities (TDSPRC) that receives and retransmits all frames of the first network and the same or different network, and the method comprising:
collecting topology information related to three or more different Open System Interconnection (OSI) model layers from a plurality of network devices working in networks that belong to different OSI layers;
identifying alternate paths, based at least in part on the collected topology information related to three or more different OSI layers, between the first node and the second node;
creating a collective virtual network (CVN) including the known paths and the alternate paths, for a particular flow, identify an optimal path in the CVN instead of a known path between the first node and the second node; and
modifying the data frames of the particular flow to be compatible with a network technology employed by the identified optimal path, wherein the modification is implemented by the TDSPRC and the TDSPRC is not a member in at least one of the networks.

27. The method of claim 26, wherein the act of identifying alternate paths further comprises: receiving a message; identifying a new network associated with the message; and including the new network in the collective virtual network.

28. The method of claim 26, wherein prior to the act of identifying alternate paths, the method comprises detecting an event that triggers the identifying act.

29. The method of claim 27, wherein the new network differs from at least one other network in the collective virtual network at least in one network characteristic.

30. The method of claim 29, wherein the at least one network characteristic is a layer in a similar Open System Interconnection (OSI) model.

* * * * *